US012510052B1

(12) United States Patent
D'Amato et al.

(10) Patent No.: US 12,510,052 B1
(45) Date of Patent: Dec. 30, 2025

(54) SYSTEM AND METHOD FOR OPTIMIZING CONTROL OF A WIND TURBINE

(71) Applicant: General Electric Renovables Espana, S.L., Barcelona (ES)

(72) Inventors: Fernando Javier D'Amato, Avon, CT (US); Kalpesh Singal, Ballston Spa, NY (US); Su Liu, Niskayuna, NY (US); Souransu Nandi, Niskayuna, NY (US); Justin Edwin Barton, North Huntingdon, PA (US); Conner Brooks Shane, Glenville, NY (US); Joji Joykutty, Bengaluru (IN)

(73) Assignee: GE Vernova Renovables Espana, S.L., Barcelona (ES)

( * ) Notice: Subject to any disclaimer, the term of this patent is extended or adjusted under 35 U.S.C. 154(b) by 0 days.

(21) Appl. No.: 18/756,532

(22) Filed: Jun. 27, 2024

(51) Int. Cl.
*F03D 7/02* (2006.01)
*F03D 17/00* (2016.01)

(52) U.S. Cl.
CPC ......... *F03D 7/0224* (2013.01); *F03D 17/009* (2023.08); *F05B 2260/70* (2013.01); *F05B 2270/32* (2013.01); *F05B 2270/321* (2013.01); *F05B 2270/327* (2013.01)

(58) Field of Classification Search
CPC .......................... F03D 17/009; F05B 2260/70
See application file for complete search history.

(56) References Cited

U.S. PATENT DOCUMENTS

| 4,455,614 | A  | 6/1984 | Martz et al. |
| 7,062,370 | B2 | 6/2006 | Vhora et al. |
| 7,225,343 | B1 | 5/2007 | Honig et al. |
| 7,805,205 | B2 | 9/2010 | Santos |

(Continued)

FOREIGN PATENT DOCUMENTS

| CN | 102175449 B | 7/2012 |
| CN | 102592026 A | 7/2012 |

(Continued)

OTHER PUBLICATIONS

Abo-Khalid et al., MPPT Control of Wind Generation Systems Based on Estimated Wind Speed Using SVR, IEEE, vol. 55, No. 3, Mar. 2008, 1489-1490.

(Continued)

*Primary Examiner* — Danielle M. Christensen
(74) *Attorney, Agent, or Firm* — Dority & Manning, P.A.

(57) ABSTRACT

The present disclosure is directed to a method for optimizing control of a wind turbine that includes receiving, via a control system, a condition of the wind turbine. The method also includes estimating a current state of the wind turbine using the condition. The method also includes calculating, via a model implemented by the control system, a linearized representation of an operation of the wind turbine for a future time interval following the current state. The method also includes defining an optimization problem to be solved. The method also includes determining a pitch adjustment factor for modifying the current state of the wind turbine. The method also includes calculating, via the optimization (Continued)

solver, an optimized pitch parameter for a rotor blade of the wind turbine. The method also includes adjusting a pitch parameter of the rotor blade to the optimized pitch parameter to improve control.

20 Claims, 16 Drawing Sheets

(56) References Cited

U.S. PATENT DOCUMENTS

| | | | |
|---|---|---|---|
| 7,818,276 | B2 | 10/2010 | Veillette et al. |
| 8,191,136 | B2 | 5/2012 | Dudfield |
| 8,219,356 | B2 | 7/2012 | Mihok et al. |
| 8,468,244 | B2 | 6/2013 | Redlich et al. |
| 8,756,047 | B2 | 6/2014 | Patel |
| 8,849,737 | B1 | 9/2014 | Engler |
| 8,973,123 | B2 | 3/2015 | Chong et al. |
| 8,973,124 | B2 | 3/2015 | Chong et al. |
| 9,046,886 | B2 | 6/2015 | Chong et al. |
| 9,130,983 | B2 | 9/2015 | Heo et al. |
| 9,217,416 | B2 | 12/2015 | Spruce et al. |
| 9,245,116 | B2 | 1/2016 | Evans et al. |
| 9,261,077 | B2 | 2/2016 | Tirumalai et al. |
| 9,379,951 | B2 | 6/2016 | Mihnev |
| 9,384,885 | B2 | 7/2016 | Karalis et al. |
| 9,397,997 | B2 | 7/2016 | Chong et al. |
| 9,405,900 | B2 | 8/2016 | Dixit et al. |
| 9,483,049 | B2 | 11/2016 | Maeda et al. |
| 9,645,574 | B2 | 5/2017 | Frankenstein et al. |
| 9,712,553 | B2 | 7/2017 | Nguyen et al. |
| 9,719,494 | B2 | 8/2017 | Prats Mustaros et al. |
| 9,752,561 | B2 | 9/2017 | Egedal et al. |
| 9,920,746 | B2 | 3/2018 | Diedrichs et al. |
| 9,945,264 | B2 | 4/2018 | Wichmann et al. |
| 9,983,555 | B2 | 5/2018 | Bengston |
| 9,998,487 | B2 | 6/2018 | Mestha et al. |
| 10,047,722 | B2 | 8/2018 | Vaddi et al. |
| 10,267,291 | B2 | 4/2019 | Hammerum et al. |
| 10,302,067 | B2 | 5/2019 | Herbsleb et al. |
| 10,303,954 | B2 | 5/2019 | Xiao et al. |
| 10,306,342 | B2 | 5/2019 | Demuth |
| 10,337,497 | B2 | 7/2019 | Hammerum et al. |
| 10,344,740 | B2 | 7/2019 | Caponetti et al. |
| 10,387,728 | B2 | 8/2019 | Arya et al. |
| 10,417,415 | B2 | 9/2019 | Abbaszadeh et al. |
| 10,461,540 | B2 | 10/2019 | Ghaemi et al. |
| 10,465,659 | B2 | 11/2019 | Hammerum et al. |
| 10,584,683 | B2 | 3/2020 | Lysgaard et al. |
| 10,594,712 | B2 | 3/2020 | Mestha et al. |
| 10,678,912 | B2 | 6/2020 | Mestha et al. |
| 10,691,087 | B2 | 6/2020 | D'Amato et al. |
| 10,728,282 | B2 | 7/2020 | Mestha et al. |
| 10,749,890 | B1 | 8/2020 | Aloisio et al. |
| 10,753,338 | B2 | 8/2020 | Miranda et al. |
| 10,907,612 | B2 | 2/2021 | Grunnet et al. |
| 10,975,845 | B2 | 4/2021 | Grunnet et al. |
| 11,053,918 | B2 | 7/2021 | Hovgaard et al. |
| 11,125,209 | B2 | 9/2021 | Kjaer et al. |
| 11,293,404 | B2 | 4/2022 | Hovgaard et al. |
| 11,384,730 | B2 | 7/2022 | Dalsgaard et al. |
| 11,421,652 | B2 | 8/2022 | Thomsen et al. |
| 11,429,713 | B1 | 8/2022 | Donovan et al. |
| 11,519,386 | B2 | 12/2022 | Grunnet et al. |
| 11,536,249 | B2 | 12/2022 | Gebraad |
| 11,629,694 | B2 | 4/2023 | D'Amato et al. |
| 2002/0032717 | A1 | 3/2002 | Malan et al. |
| 2006/0010493 | A1 | 1/2006 | Piesco et al. |
| 2007/0289013 | A1 | 12/2007 | Lim |
| 2008/0010225 | A1 | 1/2008 | Gonsalves et al. |
| 2008/0288330 | A1 | 11/2008 | Hildebrand et al. |
| 2011/0020122 | A1 | 1/2011 | Parthasarathy et al. |
| 2011/0148112 | A1 | 6/2011 | Ormel et al. |
| 2011/0272161 | A1 | 11/2011 | Kumaran et al. |
| 2012/0049516 | A1 | 3/2012 | Viassolo |
| 2012/0070281 | A1 | 3/2012 | Fuglsang et al. |
| 2012/0209539 | A1 | 8/2012 | Kim |
| 2013/0104236 | A1 | 4/2013 | Ray et al. |
| 2013/0110414 | A1 | 5/2013 | Caponetti et al. |
| 2013/0132149 | A1 | 5/2013 | Wei et al. |
| 2013/0174664 | A1 | 7/2013 | Olesen |
| 2013/0204664 | A1 | 8/2013 | Romagnolo et al. |
| 2013/0214535 | A1 | 8/2013 | Brath |
| 2013/0291115 | A1 | 10/2013 | Chong et al. |
| 2013/0297266 | A1 | 11/2013 | Brincker |
| 2013/0302161 | A1 | 11/2013 | Koerber et al. |
| 2013/0318022 | A1 | 11/2013 | Yadav et al. |
| 2014/0003939 | A1 | 1/2014 | Adams et al. |
| 2014/0103652 | A1 | 4/2014 | Ubben et al. |
| 2014/0107521 | A1 | 4/2014 | Galan |
| 2014/0201780 | A1 | 7/2014 | Wong et al. |
| 2014/0244192 | A1 | 8/2014 | Craig et al. |
| 2014/0283047 | A1 | 9/2014 | Dixit et al. |
| 2014/0297635 | A1 | 10/2014 | Orduna et al. |
| 2014/0298399 | A1 | 10/2014 | Heo et al. |
| 2014/0337973 | A1 | 11/2014 | Foster et al. |
| 2014/0359708 | A1 | 12/2014 | Schwartz |
| 2015/0033341 | A1 | 1/2015 | Schmidtler et al. |
| 2015/0095003 | A1 | 4/2015 | Horowitz et al. |
| 2015/0118047 | A1 | 4/2015 | Yoon et al. |
| 2015/0149174 | A1 | 5/2015 | Gollan et al. |
| 2015/0152847 | A1* | 6/2015 | Guadayol Roig ...... F03D 7/048 290/44 |
| 2015/0249864 | A1 | 9/2015 | Tang et al. |
| 2015/0346706 | A1 | 12/2015 | Gendelman |
| 2015/0347902 | A1 | 12/2015 | Butler, Jr. et al. |
| 2016/0033941 | A1 | 2/2016 | T et al. |
| 2016/0127931 | A1 | 5/2016 | Baxley et al. |
| 2016/0160842 | A1 | 6/2016 | Pernandez De Velasco Munoz |
| 2016/0212100 | A1 | 7/2016 | Banerjee |
| 2016/0222816 | A1 | 8/2016 | Chen et al. |
| 2016/0252075 | A1 | 9/2016 | Kruger et al. |
| 2016/0328654 | A1 | 11/2016 | Bauer et al. |
| 2016/0333855 | A1 | 11/2016 | Lund et al. |
| 2016/0341636 | A1 | 11/2016 | Rajaram et al. |
| 2016/0369777 | A1 | 12/2016 | Chiang et al. |
| 2017/0034205 | A1 | 2/2017 | Canedo et al. |
| 2017/0052960 | A1 | 2/2017 | Alizadeh-Shabdiz et al. |
| 2017/0054751 | A1 | 2/2017 | Schneider et al. |
| 2017/0142133 | A1 | 5/2017 | Kallos |
| 2017/0244726 | A1 | 8/2017 | Finkel et al. |
| 2017/0284896 | A1 | 10/2017 | Harpale et al. |
| 2017/0310690 | A1 | 10/2017 | Mestha et al. |
| 2017/0346840 | A1 | 11/2017 | Barkan |
| 2017/0352245 | A1 | 12/2017 | Maher et al. |
| 2018/0017039 | A1 | 1/2018 | Davoust et al. |
| 2018/0087357 | A1 | 3/2018 | Conn et al. |
| 2018/0100488 | A1 | 4/2018 | Miranda et al. |
| 2018/0115561 | A1 | 4/2018 | Sun et al. |
| 2018/0137277 | A1 | 5/2018 | Mestha et al. |
| 2018/0142674 | A1 | 5/2018 | Hammerum et al. |
| 2018/0157831 | A1 | 6/2018 | Abbaszadeh et al. |
| 2018/0159879 | A1 | 6/2018 | Mestha et al. |
| 2018/0266392 | A1 | 9/2018 | Hovgaard et al. |
| 2018/0268264 | A1 | 9/2018 | Marwah et al. |
| 2018/0276375 | A1 | 9/2018 | Arov et al. |
| 2018/0335018 | A1 | 11/2018 | Cao et al. |
| 2018/0367550 | A1 | 12/2018 | Musuvathi et al. |
| 2019/0128242 | A1 | 5/2019 | Grunnet et al. |
| 2019/0154000 | A1 | 5/2019 | Hammerum et al. |
| 2019/0190938 | A1 | 6/2019 | Oba et al. |
| 2019/0230119 | A1 | 7/2019 | Mestha et al. |
| 2019/0242364 | A1 | 8/2019 | Golysheva et al. |
| 2019/0362070 | A1 | 11/2019 | Abbaszadeh |
| 2020/0056588 | A1 | 2/2020 | Nielsen |
| 2020/0244677 | A1 | 7/2020 | Abbaszadeh et al. |
| 2020/0271093 | A1 | 8/2020 | Grunnet et al. |
| 2020/0291922 | A1 | 9/2020 | Hovgaard et al. |
| 2020/0318614 | A1 | 10/2020 | Hovgaard et al. |
| 2020/0340450 | A1 | 10/2020 | Grunnet et al. |
| 2020/0378361 | A1 | 12/2020 | Hovgaard et al. |
| 2021/0081270 | A1 | 3/2021 | Abbaszadeh et al. |
| 2021/0115895 | A1 | 4/2021 | D'Amato et al. |
| 2021/0295439 | A1 | 9/2021 | Konrardy et al. |

(56) References Cited

U.S. PATENT DOCUMENTS

| | | |
|---|---|---|
| 2021/0372371 A1 | 12/2021 | Nielsen et al. |
| 2022/0046047 A1 | 2/2022 | Lewis |
| 2022/0334540 A1 | 10/2022 | D'Amato et al. |
| 2022/0345468 A1 | 10/2022 | Yan et al. |
| 2023/0077025 A1 | 3/2023 | Fu et al. |
| 2025/0198379 A1* | 6/2025 | D'Amato .................. F03D 7/02 |

FOREIGN PATENT DOCUMENTS

| | | |
|---|---|---|
| CN | 108694277 A | 10/2018 |
| CN | 109460621 A | 3/2019 |
| CN | 112261042 A | 1/2021 |
| DE | 102013208084 B3 | 5/2014 |
| JP | 6510959 B2 | 5/2019 |
| KR | 20140109132 A | 9/2014 |
| KR | 20180119960 A | 11/2018 |
| WO | WO2007/010322 A1 | 1/2007 |
| WO | WO2014/144857 A2 | 9/2014 |
| WO | WO2015/092817 A1 | 6/2015 |
| WO | WO2016/020660 A1 | 2/2016 |
| WO | WO2016/139097 A1 | 9/2016 |
| WO | WO2016/172514 A1 | 10/2016 |
| WO | WO2016/176682 A1 | 11/2016 |
| WO | WO2019/114896 A1 | 6/2019 |

OTHER PUBLICATIONS

Almalawi et al., An Unsupervised Anomaly-based Detection Approach for Integrity Attacks on SCADA Systems, ScienceDirect, Computers & Security, vol. 46, Oct. 2014, pp. 94-110. (Abstract Only) https://doi.org/10.1016/j.cose.2014.07.005.

Badihi et al., A Review on Application of Monitoring, Diagnosis, and Fault-tolerant Control to Wind Turbines, 2013 Conference on Control and Fault-Tolerant Systems (SysTol), Nice, France, Oct. 9-11, 2013, pp. 365-370.

Badihi et al., Model-Based Fault-Tolerant Pitch Control of an Offshore Wind Turbine, IFAC-Papersonline, vol. 51, Issue 18, 2018, pp. 221-226. (Abstract Only).

Bossanyi, Individual Blade Pitch Control for Load Reduction, Wind Energy, vol. 6, Issue 2, Apr./Jun. 2003, 119-128. (Abstract Only) Retrieved Oct. 10, 2023 from Weblink: https://doi.org/10.1002/we.76.

Boyano et al., Delamination Fracture Behavior of Unidirectional Carbon Reinforced Composites Applied to Wind Turbine Blades, Materials 2021, vol. 14, Issue 3, 593. https://doi.org/10.3390/ma14030593.

Cho et al., Model-based Fault Detection, Fault Isolation and Fault-tolerant Control of a Blade Pitch System in Floating Wind Turbines, Renewable Energy, vol. 120, May 2018, pp. 306-321.

Datta et al, Cyber Threat Analysis Framework for the Wind Energy Based Power System, CPS '17: Proceedings of the 2017 Workshop on Cyber-Physical Systems Security and Privacy, Nov. 2017, pp. 81-92. https://doi.org/10.1145/3140241.3140247.

El-Baklish et al., Nonlinear Model Predictive Pitch Control of Aero-Elastic Wind Turbine Blades, Renewable Energy, vol. 161, 2020, 777-791.

Feng et al., A Model-Based Predictive Control for FTC for Wind Turbine Speed Sensor Fault, 2013 Conference on Control and Fault-Tolerant Systems (SYSTOL), IEEE, XP032545765, Oct. 9, 2013, pp. 504-509. (Abstract Only).

Feodosyev, Book—Strength of Materials 1, Book—MIR Publishers, 1968.

Frison et al., BLASFEO: Basic Linear Algebra Subroutines for Embedded Optimization, ACM Transactions on Mathematical Software, vol. 44, No. 4, , 2017, 30 Pages. http://dx.doi.org/10.1145/3210754.

Frison et al., HPIPM: A High-Performance Quadratic Programming Framework for Model Predictive Control, IFAC-PapersOnLine, vol. 53, Issue 2, 2020, 6563-6569.

Frison et al., HPMPC—A New Software Package with Efficient Solvers for Model Predictive Control, 2015, 19 Pages. http://smart-cities-ce.org/wp-content/uploads/06-Frison-cities.pdf.

Frison et al., The BLAS API of BLASFEO Optimizing Performance for Small Matrices, ACM Transactions on Mathematical Software, vol. 46, Issue 2, Article No. 15, 1-36. (Abstract Only) https://doi.org/10.1145/3378671.

Gambier et al., Modeling the Aerodynamics of Wind Turbines for Real-Time Simulation and Control Purposes, IEEE 2017 11$^{th}$ Asian Control Conference (ASCC), 2017, 1432-1437.

Gao et al., On Cyber Attacks and Signature Based Intrusion Detection for Modbus Based Industrial Control Systems, Journal of Digital Forensics, Security and Law, vol. 9, No. 1, 2014, 20 Pages.

Hearn, Mechanics of Materials, Mechanics of Materials, Book—Pergamon International Library of Science, Technology, Engineering and Social Studies 1$^{st}$ Ed, 1977, 643 Pages. (Abstract Only) https://openlibrary.org/books/OL5214863M/Mechanics_of_materials.

Jiang et al., Wind Turbine Fault Detection Using a Denoising Autoencoder with Temporal Information, IEEE, Journals & Magazines, IEEE/ASME Transactions on Mechatronics, vol. 23, Issue 1, Feb. 2018, pp. 89-100. (Abstract Only) https://doi.org/10.1109/TMECH.2017.2759301.

Kanev et al., Wind Turbine Extreme Gust Control, Wind Energy, vol. 13, 2010, 18-35.

Karimipour et al., Relaxation-based Anomaly Detection in Cyber-Physical Systems Using Ensemble KalmanFilter, ResearchGate, IET Cyber-Physical Systems Theory & Applications, vol. 5, Issue 1, 2020, p. 49-58. https://www.researchgate.net/deref/http%3A%2F%2Fdx.doi.org%2F10.1049%2Fiet-cps.2019.0031.

Kavaz et al., Fault Detection of Wind Turbine Sensors Using Artificial Neural Networks, Journal of Sensors, Dec. 19, 2018, 12 Pages.

Kerres et al., Economic Evaluation of Maintenance Strategies for Wind Turbines: A Stochastic Analysis, The Institution of Engineering and Technology (IET), Journals & Magazines, IET Renewable Power Generation, vol. 9, Issue 7, Sep. 2015, pp. 766-774. (Abstract Only) https://doi.org/10.1049/iet-rpg.2014.0260.

Knowles et al., A Survey of Cyber Security Management in Industrial Control Systems, International Journal of Critical Infrastructure Protection, vol. 9, 2015, pp. 52-80. http://dx.doi.org/10.1016/j.jcip.2015.02.002.

Knudsen et al., A Nonlinear Model Predictive Control Scheme for Sensor Fault Tolerance in Observation Processes, International Journal of Robust and Nonlinear Control, vol. 30, Issue 14, 2020, 5657-5677. https://doi.org/10.1002/rnc.5104.

Kosek et al., Ensemble Regression Model-based Anomaly Detection for Cyber-Physical Intrusion Detection in Smart Grids, 2016 IEEE Electrical Power and Energy Conference (EPEC), 2016, Ottawa, ON Canada. (Abstract Only) https://doi.org/10.1109/EPEC.2016.7771704.

Li et al., Data Driven Condition Monitoring of Wind Power Plants Using Cluster Analysis, IEEE, 2015 International Conference on Cyber-Enabled Distributed Computing and Knowledge Discovery, 2015, Xi'an China. (Abstract Only) https://doi.org/10.1109/CyberC.2015.16.

Li et al., Asset-Based Dynamic Impact Assessment of Cyberattacks for Risk Analysis in Industrial Control Systems, IEEE Transactions on Industrial Informatics, IEEE Service Center, vol. 14, No. 2, 2018, 608-618.

Lio et al., A Review on Applications of Model Predictive Control to Wind Turbines, In: Control (Control), 2014 UKACC International Conference on Control, 2014, 7 Pages.

Lu et al., Analysis and Design of Coleman Transform-Based Individual Pitch Controllers for Wind Turbine Load Reduction, Wind Energy, vol. 8, Issue 8, 2015, 19 Pages. http://dx.doi.org/10.1002/we.1769.

Ma et al., Buckling Analysis for Wind Turbine Tower Design: Thrust Load Versus Compression Load Based on Energy Method, Energies, 2020, vol. 13, 5302, 32 pages. http://dx.doi.org/10.3390/en13205302.

(56) References Cited

OTHER PUBLICATIONS

Mahmoud et al., Adaptive and Predictive Control Strategies for Wind Turbine Systems: A Survey, IEEE CAA Journal of Automatica Sinica, vol. 6, No. 2, 2019, 364-378.
Mantere et al., Challenges of Machine Learning Based Monitoring for Industrial Control System Networks, Advanced Information Networking and Applications Workshops (WAINA), 2012 26th International Conference, Fukuoka, Mar. 26-29, 2012, pp. 968-972.
Mohammadpourfard et al., Identification of False Data Injection Attacks with Considering the Impact of Wind Generation and Topology Reconfigurations, IEEE, Journals & Magazines, IEEE Transactions on Sustainable Energy, vol. 9, Issue 3, Jul. 2018, pp. 1349-1364. (Abstract Only) https://doi.org/10.1109/TSTE.2017.2782090.
Mulders et al., Preventing Wind Turbine Tower Natural Frequency Excitation with a Quasi-LPV Model Predictive Control Scheme, Wind Energy, vol. 23, Issue 3, 2019, 627-644. https://doi.org/10.1002/we.2447.
Nalavade et al., Finding Frequent Itemsets using Apriori Algorihm to Detect Intrusions in Large Dataset, International Journal of Computer Applications & Information Technology, vol. 6, Issue 1, Jun.-Jul. 2014, pp. 84-92.
Nath, Low Latency Anomaly Detection with Imperfect Models, Dissertation University of Arkansas, May 2020, 24 pages.
Odgaard et al., A Benchmark Evaluation of Fault Tolerant Wind Turbine Control Concepts, IEEE Transactions on Control Systems Technology, vol. 23, Issue 3, 2015, 1221-1228. https://doi.org/10.1109/TCST.2014.2361291.
Odgaard et al., On Using Pareto Optimality to Tune a Linear Model Predictive Controller for Wind Turbines, Renewable Energy, vol. 87, 2016, 884-891.
Petrovic et al., MPC Framework for Constrained Wind Turbine Individual Pitch Control, Wind Energy, vol. 24, Issue 1, Jan. 2021, 54-68. https://doi.org/10.1002/we.2558.
Qian et al., A Novel Wind Turbine Condition Monitoring Method Based on Cloud Computing, Science Direct, Renewable Energy, vol. 135, May 2019, pp. 390-398. (Abstract Only) https://doi.org/10.1016/j.renene.2018.12.045.
Qiao et al., A Survey on Wind Turbine Condition Monitoring and Fault Diagnosis—Part II: Signals and Signal Processing Methods, IEEE Transactions on Industrial Electronics, vol. 62, Issue 10, Oct. 2015, 6546-6557. https://doi.org/10.1109/TIE.2015.2422394.
Qiao et al., Wind Speed Estimation Based Sensor Less Output Maximization Control for a Wind Turbine Driving a DFIG, IEEE, vol. 23, Issue 3, 2008, 1156-1169.
Rasmussen et al., Application of Functional Modeling for Monitoring of WTG in a Cyber-Physical Environment, ResearchGate, IET Cyber-Physical Systems Theory & Applications, vol. 4, Jul. 2018, 9 Pages. https://www.researchgate.net/deref/http%3A%2F%2Fdx.doi.org%2F10.1049%2Fiet-cps.2017.0109.
Recalde et al., Gusts Detection in a Horizontal Wind Turbine by Monitoring of Innovations Error of an Extended Kalman Filter, Journal of Physics: Conference Series 753, 2016, 11 Pages.
Rezamand et al., A New Hybrid Fault Detection Method for Wind Turbine Blades Using Recursive PCA and Wavelet-Based PDF, IEEE, Journals & Magazines, Sensors Journal, vol. 20, Issue 4, Feb. 15, 2020, pp. 2023-2033. (Abstract Only) https://doi.org/10.1109/JSEN.2019.2948997.
Skormin et al., The Behavioral Approach to Diagnostics of Cyber-Physical Systems, Autotestcon, 2014 IEEE, St. Louis, MO, Sep. 15-18, 2014, pp. 26-30.
Timoshenko et al., Book—Theory of Elasticity, vol. 1, McGraw-Hill 1970, 608 pages. https://www.biblio.com/9780070647206.
Vanini et al., Fault Detection and Isolation of a Dual Spool Gas Turbine Engine Using Dynamic Neural Networks and Multiple Model Approach, ScienceDirect, vol. 259, Feb. 20, 2014, pp. 234-251. (Abstract Only) https://doi.org/10.1016/j.ins.2013.05.032.
Vencore Labs, Vencore Labs to Assist DARPA in Protecting the Nation's Electrical Grid, PR Newswire a cision Company, Chantilly, VA, Sep. 13, 2016, 2 Pages. http://www.econline.com/doc/vencore-labs-to-assist-darpa-in-protecting-the-nation-s-electrical-grid-0001.
Wang, Unified Estimator for Offshore Wind Turbines—Prepare WTLin DataIn from Bladed Simulations, 2019, 12 pages.
Xu et al., Adaptive Fault Detection in Wind Turbine via RF and CUSUM, The Institution of Engineering and Technology (IET), Journals & Magazines, IET Renewable Power Generation, vol. 14, Issue 10, Jul. 27, 2020, pp. 1789-1796. (Abstract Only) https://doi.org/10.1049/iet-rpg.2019.0913.
Yampikulsakul et al., Condition Monitoring of Wind Power System with Nonparametric Regression Analysis, IEEE Transactions on Energy Conversion, vol. 29, Issue 2, Jun. 2014, pp. 288-299.
Yan et al., On Accurate and Reliable Anomaly Detection for Gas Turbine Combustors: A Deep Learning Approach, Annual Conference of the Prognostics and Health Management Society, 2015, pp. 1-8.
Yi et al., Discriminative Feature Learning for Blade Icing Fault Detection of Wind Turbine, IOP Science, Measurement Science and Technology, 115102, vol. 31, No. 11, Aug. 25, 2020. (Abstract Only) https_//doi.org/10.1088/1361-6501/ab9bb8.
Yu, Unsupervised Machine Learning Anomaly Detection for Multivariate Time-Series Data in Wind Turbine Converters, Theseus, May 2020, 63 Pages.
Zhang et al., A Data-Driven Design for Fault Detection of Wind Turbines Using Random Forests and XGboost, IEEE, Journals & Magazines, vol. 6, 2018, pp. 21020-21031. https://doi.org/10.1109/ACCESS.2018.2818678.
Zhang et al., Fault Diagnosis Strategy for Wind Turbine Generator Based on the Gaussian Process Metamodel, Mathematical Problems in Engineering, vol. 2020, Article ID 4295093, 2020, 10 Pages. https://www.hindawi.com/journals/mpe/2020/4295093/.

\* cited by examiner

SYSTEM AND METHOD FOR OPTIMIZING CONTROL OF A WIND TURBINE

FIELD

The present disclosure generally relates to wind turbines and, more particularly, to a system and method for optimizing control of a wind turbine.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades are the primary elements for converting wind energy into electrical energy. The blades typically have the cross-sectional profile of an airfoil such that, during operation, air flows over the blade producing a pressure difference between its sides. Consequently, a lift force, which is directed from the pressure side towards the suction side, acts on the blade. The lift force generates torque on the main rotor shaft, which is connected to a generator for producing electricity.

The amount of power that may be produced by a wind turbine is typically limited by structural limitations (i.e., design loads) of the individual wind turbine components. For example, the blades of a wind turbine may experience loads associated with both average loading due to turbine operation and dynamically fluctuating loads due to environmental conditions. These loads may be affected by the pitch angle of the blades and other factors. Such loading may damage turbine components, such as the pitch or yaw bearings, thereby causing the turbine components to fail. The fluctuating loads can change day-to-day or season-to-season and may be influenced by wind speed, wind peaks, wind turbulence, wind shear, changes in wind direction, density in the air, bearing misalignment, upflow, or similar conditions.

As such, it is an object of wind turbine design to ensure loads acting on the turbine components do not exceed design loads. Thus, many wind turbines employ one or more sensors configured to measure the loads acting on the various wind turbine components. Additionally, a wind turbine may utilize a control system configured to estimate loads acting on the wind turbine based on a variety of factors.

Thus, the control system may operate in conjunction with the sensor(s) to estimate loads acting upon the wind turbine components and adjust the operation of the wind turbine in response to the estimated loads. For example, the control system may instruct the wind turbine to adjust the pitch angle of the rotor blades or the rotor position of the wind turbine. These adjustments may be made to improve one or more conditions associated with the operation of the wind turbine. However, improving a first condition associated with the wind turbine may detrimentally impact another, second condition associated with the wind turbine. Further, the control system may overcorrect or undercorrect the operation of the wind turbine when trying to optimize a condition associated with the operation of the wind turbine.

In view of the foregoing, the art is continuously seeking new and improved systems for optimizing control of a wind turbine, such as pitch control.

BRIEF DESCRIPTION

Aspects and advantages of the invention will be set forth in part in the following description, which may be obvious from the description or may be learned through practice of the invention.

In one aspect, the present disclosure is directed to a method for optimizing control of a wind turbine. The method includes receiving, via a control system, at least one condition of the wind turbine. The method also includes estimating, via the control system, a current state of the wind turbine using the at least one condition. The method also includes calculating, via a model implemented by the control system, a linearized representation of an operation of the wind turbine for a future time interval following the current state. The method also includes defining, via the control system, an optimization problem to be solved where the optimization problem includes a cost function and a pitch constraint. The method also includes determining, via the control system, a pitch adjustment factor for modifying the current state of the wind turbine where the pitch adjustment factor includes at least one weight in the cost function that when implemented increases or reduces a behavior exhibited by the wind turbine where the cost function is implemented in an optimization solver implemented by the control system. The method also includes calculating, via the optimization solver implemented in the control system, an optimized pitch parameter for at least one rotor blade of the wind turbine from the linearized representation using the pitch adjustment factor and the pitch constraint where the optimized pitch parameter is the solution to the optimization problem. The method also includes adjusting a pitch parameter of the at least one rotor blade to the optimized pitch parameter such that the behavior exhibited by the wind turbine is increased or reduced and the control of the wind turbine is improved.

In an embodiment of the method, the at least one condition includes at least one measurement of rotor speed, generator speed, wind speed, wind direction, wind shear, wind veer, wind turbulence, structural forces or moments, structural displacements, structural velocities, or structural accelerations.

In an embodiment of the method, the current state of the wind turbine includes an instantaneous aerodynamic effect distributed across a portion of the wind turbine where the instantaneous aerodynamic effect includes at least one of forces or moments acting upon the portion of the wind turbine, or the current state of the wind turbine includes an instantaneous structural effect across a portion of the wind turbine where the instantaneous structural effect includes at least one of structural displacement, structural velocity or structural acceleration of any structural component of the wind turbine.

In an embodiment of the method, the improvement of the control of the wind turbine includes a decrease in load on the wind turbine, an increase in bearing life expectancy, an increase in energy production, an increase in power quality, an increase in power tracking performance, or an increase in speed tracking performance.

In an embodiment of the method, the optimized pitch parameter includes a trajectory of a pitch angle, a pitch rate, or a pitch acceleration of the at least one rotor blade of the wind turbine.

In an embodiment of the method, the weight corresponds to a symmetric pitching motion of the at least one rotor blade of the wind turbine.

In an embodiment of the method, the weight corresponds to a non-symmetric pitching motion of the at least one rotor blade of the wind turbine.

In an embodiment of the method, the weight corresponds to an amplitude of harmonics higher than a fundamental frequency of a pitch angle, a pitch rate, or a pitch acceleration of the at least one rotor blade.

In an embodiment of the method, the at least one rotor blade includes a first rotor blade and a second rotor blade where the pitch angle, the pitch rate, or the pitch acceleration of the first rotor blade includes a higher frequency than the pitch angle, the pitch rate, or the pitch acceleration of the second rotor blade where the weight is applied to the pitch angle, the pitch rate, or the pitch acceleration of the first rotor blade such that the amplitude of the harmonics higher than the fundamental frequency of the pitch angle, the pitch rate, or the pitch acceleration is decreased.

In an embodiment of the method, the pitch adjustment factor includes one of linear or quadratic terms at the future time interval where the pitch constraint includes linear or quadratic constraints at the future time interval or where the pitch adjustment factor includes variance or tracking for a pitch angle, a pitch rate, or a pitch acceleration of the at least one rotor blade.

In an embodiment of the method, the pitch constraint corresponds with a maximum or a minimum allowable pitch angle, pitch rate, or pitch acceleration for the at least one rotor blade or where the pitch constraint corresponds with a maximum or a minimum allowable pitch motor torque, current, voltage, or power.

In an embodiment of the method, the pitch constraint further includes an increase or decrease of the maximum allowable pitch angle, pitch rate, or pitch acceleration of the at least one rotor blade or a decrease or increase of the minimum allowable pitch angle, pitch rate, or pitch acceleration of the at least one rotor blade where the increases or decreases of the maximum or minimum allowable pitch angle, pitch rate, or pitch acceleration are applied at the future time interval in response to the received at least one condition or where the pitch constraint further includes an increase or decrease of the maximum allowable pitch motor torque, current, voltage, or power or a decrease or increase of the minimum allowable pitch motor torque, current, voltage, or power where the increases or decreases of the maximum or minimum allowable pitch angle, pitch rate, or pitch acceleration are applied at the future time interval in response to the received at least one condition.

In an embodiment of the method, the pitch adjustment factor includes two or more pitch adjustment factors where the optimized pitch parameter for the at least one rotor blade is calculated using the two or more pitch adjustment factors and the pitch constraint.

In an embodiment of the method, the pitch adjustment factor includes one or more penalties for a total pitch angle change of the at least one rotor blade or penalties for a product of a pitch travel of the at least one rotor blade and a magnitude of load on the at least one rotor blade.

In an embodiment, the method further includes calculating, via the optimization solver implemented in the control system, an optimized torque for a rotor of the wind turbine from the linearized representation using the pitch adjustment factor using the pitch adjustment factor and the pitch constraint; and adjusting a torque of the rotor to the optimized torque such that the behavior exhibited by the wind turbine is increased or reduced and the control of the wind turbine is improved.

In another aspect, the present disclosure is directed to a system for optimizing control of a wind turbine. The system includes at least one sensor configured to monitor at least one condition of the wind turbine. The system also includes a control system configured to receive the at least one condition of the wind turbine. The control system is also configured to estimate, via the control system, a current state of the wind turbine using the at least one condition. The control system is also configured to calculate, via a model implemented by the control system, a linearized representation of an operation of the wind turbine for a future time interval following the current state. The control system is also configured to define, via the control system, an optimization problem to be solved where the optimization problem includes a cost function and a pitch constraint. The control system is also configured to determine, via the control system, the pitch adjustment factor for modifying the current state of the wind turbine where the pitch adjustment factor includes at least one weight in the cost function that when implemented increases or reduces a behavior exhibited by the wind turbine where the cost function is implemented in an optimization solver implemented by the control system. The control system is also configured to calculate, via the optimization solver implemented in the control system, an optimized pitch parameter for at least one rotor blade of the wind turbine from the linearized representation using the pitch adjustment factor and the pitch constraint where the optimized pitch parameter is the solution to the optimization problem. The control system is also configured to adjust a pitch parameter of the at least one rotor blade to the optimized pitch parameter such that the behavior exhibited by the wind turbine is increased or reduced and the control of the wind turbine is improved.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
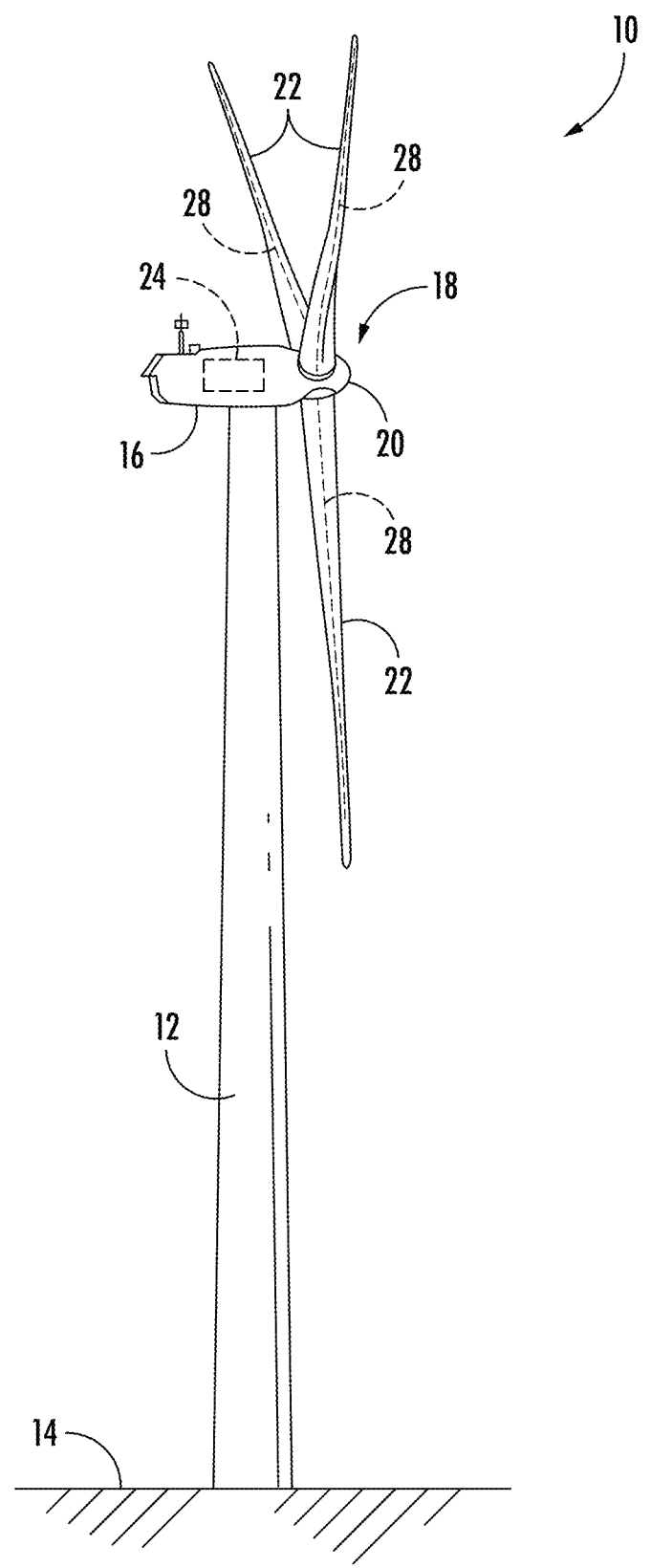
FIG. 1 illustrates a perspective view of an embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of an embodiment can be used with another embodiment to yield a still further embodiment. Thus, it is intended that the present invention covers such modifications and variations as come within the scope of the appended claims and their equivalents.

Generally, the present disclosure is directed to improved systems and methods for optimizing control of a wind turbine such as the pitch control. More specifically, the systems and methods of the present disclosure use a control system that receives one or more conditions of the wind turbine. These conditions may be received at various time intervals. These conditions may also relate to the pitch of the wind turbine. The control system then estimates a current state of the wind turbine using the condition(s). Next, the control system implements a model to calculate an expected state of the wind turbine for a future time interval using the current state of the wind turbine. After that, the control system defines an optimization problem to be solved that includes a pitch adjustment factor and a pitch constraint. Through solving the optimization problem, an optimized pitch parameter may be determined that, when implemented by the control system of the wind turbine, can improve the control of the wind turbine and increase or reduce a behavior exhibited by the wind turbine.

Once the optimization problem is defined, the control system determines the pitch adjustment factor for modifying the current state of the wind turbine by finding a weight in a cost function that is implemented in an optimization solver programmed within the control system. Next, the optimization solver is implemented to calculate an optimized pitch parameter for the rotor blade of the wind turbine from the linearized representation using the pitch adjustment factor and the pitch constraint where the optimized pitch parameter is the solution to the optimization problem. Then, the control system is utilized to adjust a pitch parameter of the rotor blade to the optimized pitch parameter such that the behavior exhibited by the wind turbine is increased or reduced and the control of the wind turbine is improved. As a result, the control of the wind turbine may be improved as evidenced by the realization of a variety of objectives.

Accordingly, the systems and methods of the present disclosure may provide a framework through which the control of a wind turbine may be regularly updated and optimized to align with objectives determined by the operator. These objectives may, at least, include a decrease in one or more loads acting on the wind turbine, an increase in pitch bearing life expectancy, and/or an increase in energy production.

Referring now to FIG. 1, a perspective view of an embodiment of a wind turbine 10 that may implement the control technology according to the present disclosure is illustrated. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine control system 26 centralized within the nacelle 16. However, in other embodiments, the control system 26 may be located within any other component of the wind turbine 10 or at a location outside the wind turbine. Further, the control system 26 may be communicatively coupled to any number of the components of the wind turbine 10 in order to control the operation of such components and/or to implement a correction action. As such, the control system 26 may include a computer or other suitable processing unit. Thus, in several embodiments, the control system 26 may include suitable computer-readable instructions that, when implemented, configure the control system 26 to perform various functions, such as receiving, transmitting, and/or executing wind turbine control signals. Accordingly, the control system 26 may generally be configured to control the various operating modes (e.g., start-up or shut-down sequences), de-rate the wind turbine, and/or control various components of the wind turbine 10 as will be discussed in more detail below.

Figure 2:
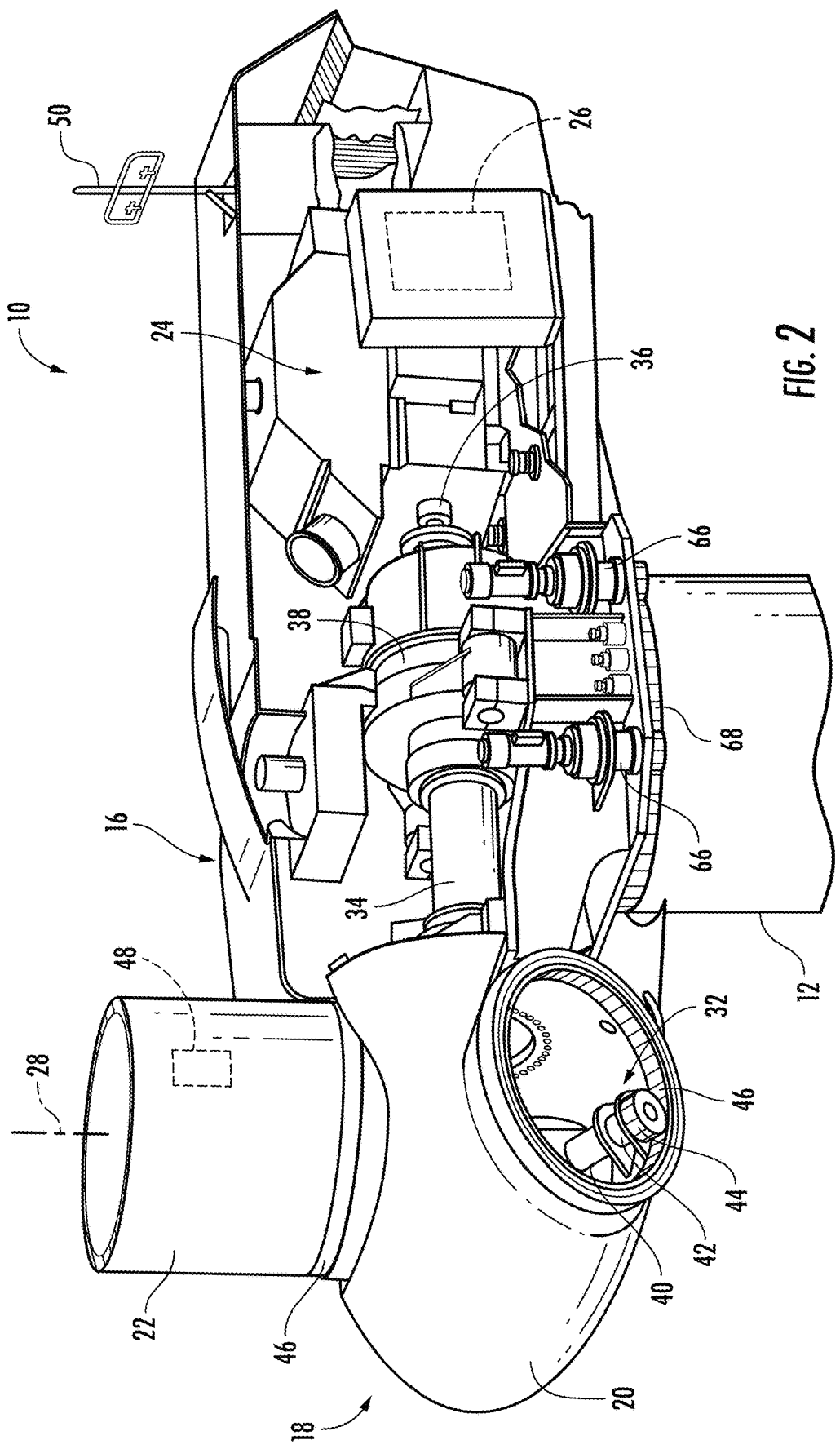
FIG. 2 illustrates a simplified, internal view of one embodiment of a nacelle of a wind turbine according to the present disclosure.

Referring now to FIG. 2, a simplified, internal view of an embodiment of the nacelle 16 of the wind turbine 10 shown in FIG. 1 is illustrated. As shown, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low-speed, high-torque input to a high-speed, low-torque output to drive the generator shaft 36 and, thus, the generator 24.

Each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 66 communicatively coupled to the control system 26, with each yaw drive mechanism(s) 66 being configured to change the angle of the nacelle 16 relative to the wind (e.g., by engaging a yaw bearing 68 of the wind turbine 10).

Still referring to FIG. 2, the wind turbine 10 may also include one or more sensors 48, 50 for measuring various operating conditions that may be used to determine the operating state of the wind turbine 10 as described in more detail below. For example, in various embodiments, the sensors may include blade sensors 48 for measuring a pitch angle, pitch rate, or pitch acceleration of one of the rotor blades 22, for measuring a load acting on one of the rotor blades 22, or for measuring the rotor speed of the rotor 18. The sensors may also include generator sensors (not shown) for monitoring the generator 24 (e.g. torque, rotational speed, acceleration and/or the power output); sensors (not shown) for measuring the imbalance loading in the rotor (e.g. main shaft bending sensors); various wind sensors 50 for measuring various wind conditions, such as wind speed, wind peaks, wind turbulence, wind shear, changes in wind direction, air density, or similar; and/or sensors (not shown) that measure structural forces or moments, structural displacements, structural velocities, or structural accelerations exhibited by or exerted upon the wind turbine 10.

In addition, the sensors may be located near the ground of the wind turbine, on the nacelle, or on a meteorological mast of the wind turbine. It should also be understood that any other number or type of sensors may be employed at any location. For example, the sensors may be Micro Inertial Measurement Units (MIMUs), strain gauges, accelerometers, pressure sensors, angle of attack sensors, vibration sensors, proximity sensors, Light Detecting and Ranging (LIDAR) sensors, camera systems, fiber optic systems, anemometers, wind vanes, Sonic Detection and Ranging (SODAR) sensors, infra lasers, radiometers, pitot tubes, radiosondes, other optical sensors, and/or any other suitable sensors. It should be appreciated that, as used herein, the term "monitor" and variations thereof indicate that the various sensors may be configured to provide a direct measurement of the conditions being monitored or an indirect measurement of such conditions. Thus, the sensors may, for example, be used to generate signals relating to the condition being monitored, which can then be utilized by the control system 26 to determine the actual condition.

Figure 3:
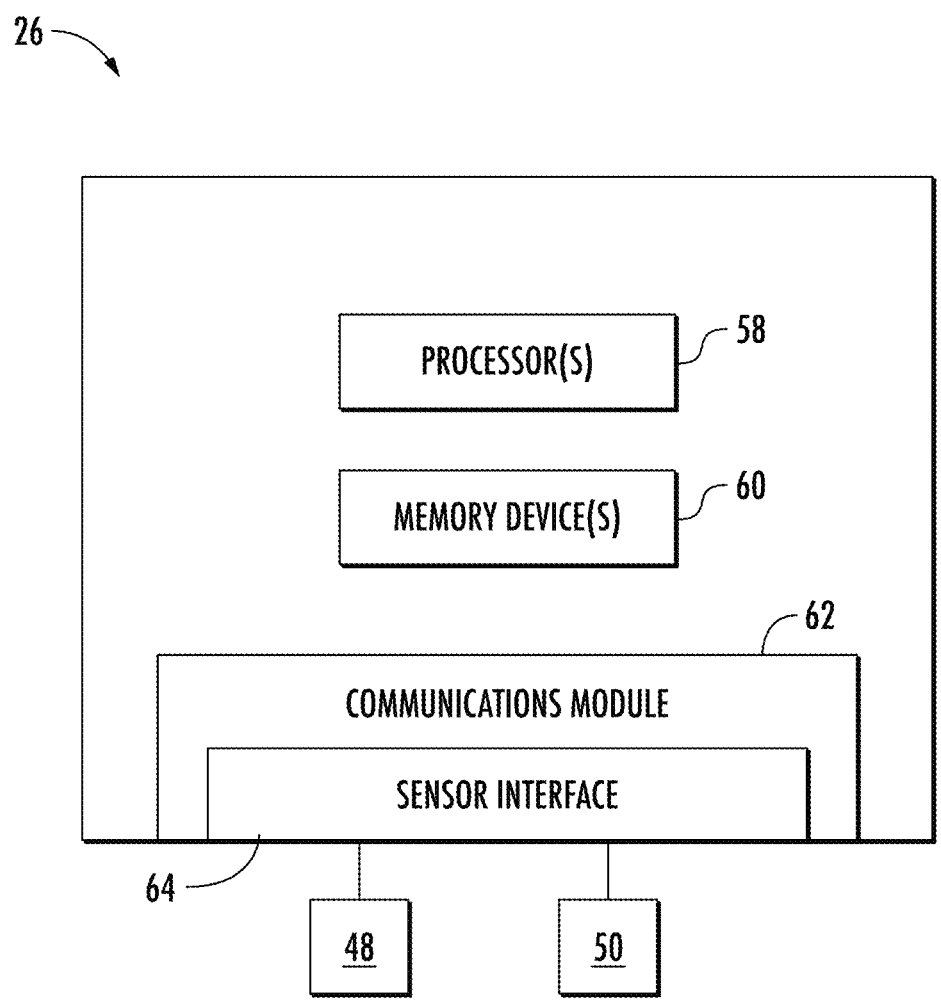
FIG. 3 illustrates a schematic diagram of an embodiment of a controller according to the present disclosure.

Referring now to FIG. 3, a block diagram of an embodiment of various components of the control system 26 according to the present disclosure is illustrated. As shown, the control system 26 may include one or more processor(s) 58 and an associated memory device(s) 60 configured to perform a variety of computer-implemented functions (e.g., performing the methods, steps, calculations, and the like and storing relevant data as disclosed herein). Additionally, the control system 26 may also include a communications module 62 to facilitate communications between the control system 26 and the various components of the wind turbine 10. Further, the communications module 62 may include a sensor interface 64 (e.g., one or more analog-to-digital converters) to permit signals transmitted from the sensors 48, 50 to be converted into signals that can be understood and processed by the processors 58. It should be appreciated that the sensors 48, 50, or any other sensor that monitors the wind turbine 10, may be communicatively coupled to the communications module 62 using any suitable means. For example, as shown in FIG. 3, the sensors 48, 50 are coupled to the sensor interface 64 via a wired connection. However, in other embodiments, the sensors 48, 50 may be coupled to the sensor interface 64 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally include memory element(s) including, but not limited to, computer-readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 60 may generally be configured to store suitable computer-readable instructions that, when implemented by the processor(s) 58, configure the control system 26 to perform various functions including, but not limited to, determining one or more current wind turbine conditions of the wind turbine 10 based on the plurality of operating data, determining a maximum wind turbine condition, transmitting suitable control signals to implement control actions to reduce loads acting on the wind turbine, and various other suitable computer-implemented functions.

As described, the control system 26 may also be capable of implementing a variety of methods of processing and control. For example and referring particularly to FIG. 4, the control system 26 may be a Model Predictive Control (MPC) system capable of implementing an MPC framework 70. The MPC framework may be any MPC system understood in the art. The MPC framework 70 may also utilize any algorithm, rule, or code, such as machine learning or artificial intelligence.

As shown, the MPC framework 70 may generally include an estimation module 72, a simulation module 74, an optimization module 76, and a conditioning module 78. The estimation module 72 is configured to receive at least one condition of the wind turbine 10 and estimate the current state of the wind turbine 10 using condition(s). The simulation module 74 is configured to implement a model to calculate an expected state of the wind turbine 10 which defines a future time interval following the current state. As described a "future time interval" may be any time in the future through which the control system 26 can predict, i.e., the prediction horizon. For example, the future time interval may be about 0.001 to 11 seconds, such as about 0.01 to 10 seconds, such as about 1 to 9 seconds.

The optimization module 76 is configured to define an optimization problem to be solved that includes a pitch adjustment factor and a pitch constraint. The optimization module 76 is also configured to determine the pitch adjustment factor for modifying the current state of the wind turbine. The optimization module is also configured to implement an optimization solver to calculate an optimized pitch parameter for the wind turbine 10 that solves the optimization problem. As further described herein, a pitch parameter is any condition that is related to the pitch system, such as the pitch drive mechanism 32 of the wind turbine 10. For example, in an embodiment, the pitch parameter may be a pitch trajectory, a pitch angle of at least one rotor blade 22, a pitch rate of at least one rotor blade 22, and/or a pitch acceleration of at least one rotor blade 22.

Once the optimized pitch parameter is determined, the control system 26 may then adjust the pitch parameter of the at least one rotor blade 22 to the optimized pitch parameter so as to optimize the control of the wind turbine 10 and/or increase or reduce a behavior exhibited by the wind turbine 10. Either before or after the pitch parameter is adjusted, the conditioning module 78 is configured to account for the adjustment of the pitch parameter and further calculate the expected state of the wind turbine 10 that represents the operation of the wind turbine 10 at a future time interval.

Accordingly, as described, the MPC framework 70 is configured to handle multiple factors within a predictive framework. Specifically, as it relates to the present disclosure, the MPC framework 70 is capable of managing input constraints, structural loads, and/or operability constraints while optimizing the operation of the wind turbine 10 as will be discussed in greater detail herein. In addition, the MPC framework 70 is configured to provide a single Multi-Input, Multi-Output (MIMO) formulation that can unify the performance and constraints objectives. Thus, the MPC framework 70 is capable of avoiding the need for complex interactions of multiple Single-Input, Single-Output (SISO) control functions that are traditionally used to address the wind turbine control design when multiple objectives are accounted.

Figure 5:
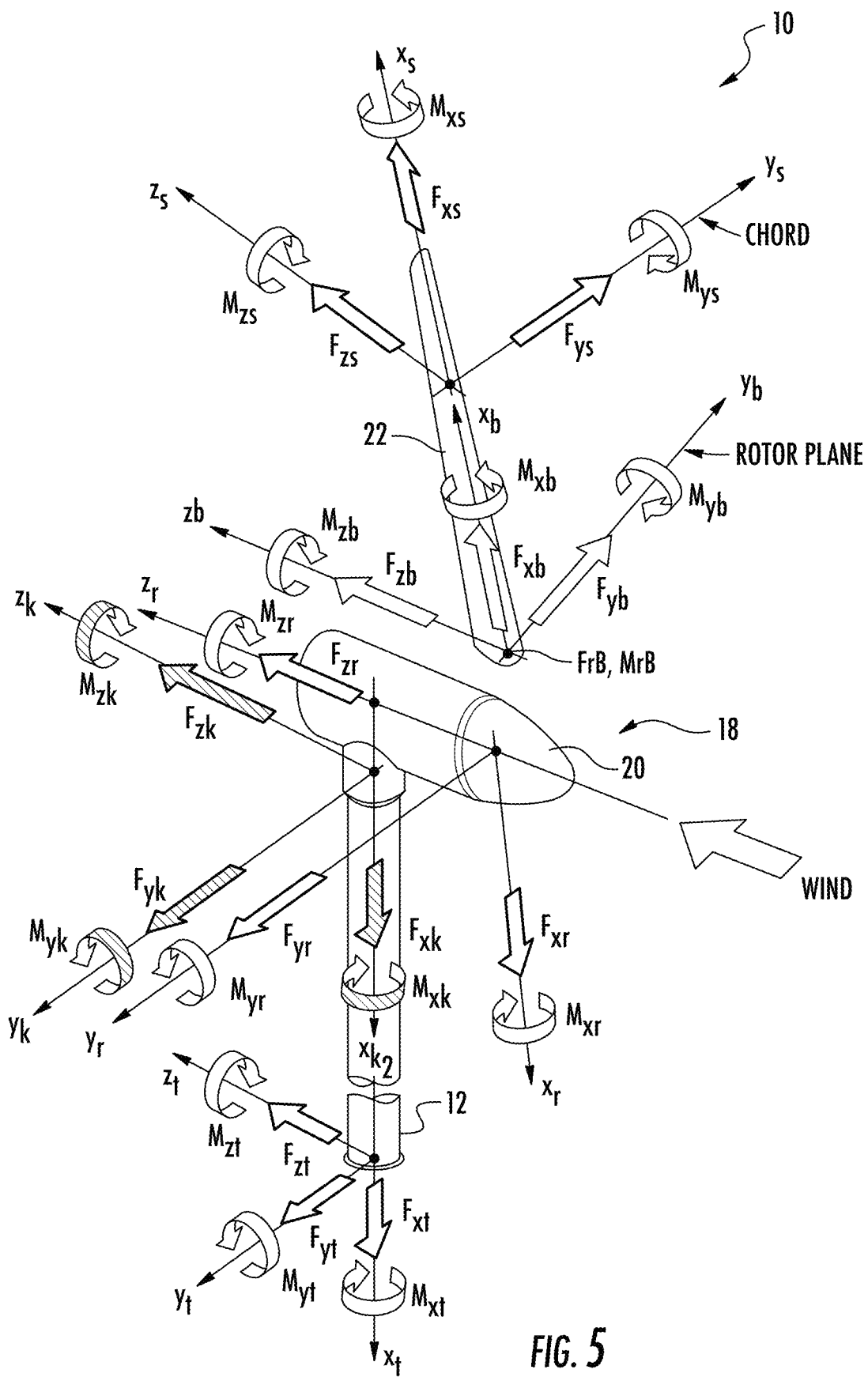
FIG. 5 illustrates a perspective view of an embodiment of a wind turbine according to the present disclosure, particularly illustrating various axes of rotation and corresponding structural forces and moments acting on the wind turbine.

Turning now to FIG. 5, an exploded view of an embodiment of the wind turbine 10 is shown, particularly illustrating various axes of rotation and corresponding structural forces and moments acting on the wind turbine 10. The forces exerted on the wind turbine 10 may vary between wind turbines, but in general, typically correspond to at least one of the following: the distributed forces from the wind traditionally decomposed in lift and drag components, the gravitational forces, the blade root resultant force (e.g. $F_{rB}$), pitch and hub forces ($F_{xB}$, $F_{yb}$, and $F_{zb}$), main shaft forces (e.g. $F_{yr}$, $F_{zr}$), main bearing forces (e.g. $F_{xr}$, $F_{yr}$), yaw drive forces (e.g. $F_{xk}$), yaw bolts/bearing/flange forces (e.g. $F_{yk}$, $F_{zk}$) or tower bending forces (e.g. $F_{xt}$, $F_{yt}$, and $F_{zt}$). As a result of the forces being exerted on the wind turbine 10 at various locations and various structural components across the entire profile of the wind turbine 10, moment loads may also be exerted upon the wind turbine 10.

Figure 4:
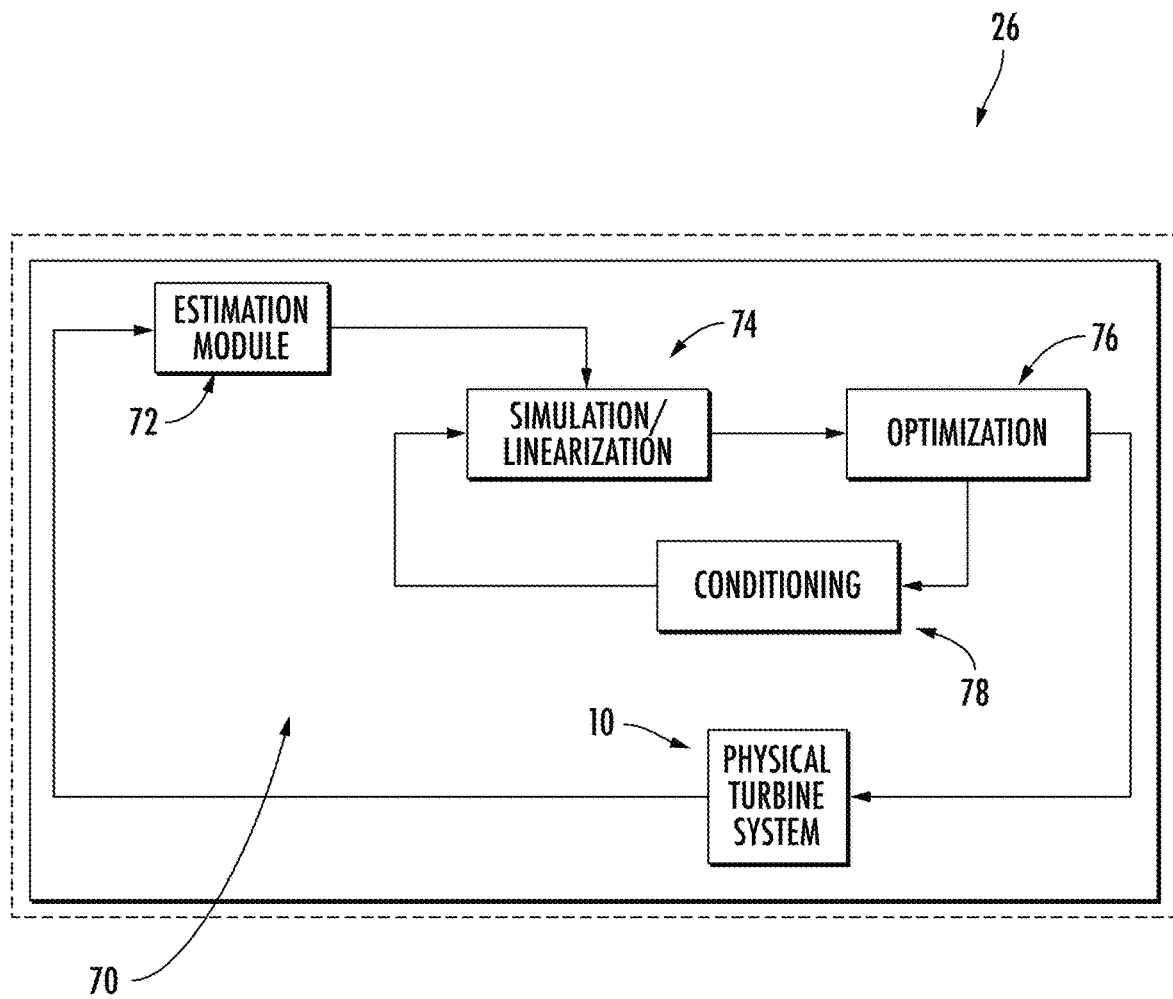
FIG. 4 illustrates a simplified diagram of an embodiment of a control system of the wind turbine according to the present disclosure.

Like the forces exerted upon the wind turbine 10, the moment loads exerted on the wind turbine 10 may vary between turbines, but in general, typically correspond to at least one of the following: the moment created by the distributed aerodynamic forces and the gravitational forces, the blade root resultant moment load (e.g. $M_{rB}$), pitch and hub moment loads ($M_{xB}$, $M_{yb}$, and $M_{zb}$), main shaft moment loads (e.g. $M_{yr}$, $M_{zr}$), main bearing moment loads (e.g. $M_{xr}$, $M_{yr}$), yaw drive moment loads (e.g. $M_{xk}$), yaw bolts/bearing/flange moment loads (e.g. $M_{yk}$, $M_{zk}$) or tower bending moment loads (e.g. $M_{xt}$, $M_{yt}$, and $M_{zt}$). It should be understood that the forces and moment loads as described herein may also include any additional forces or moment loads experienced by the wind turbine 10 and that the forces and moment loads illustrated in FIG. 4 are provided for example purposes only.

Figure 6:
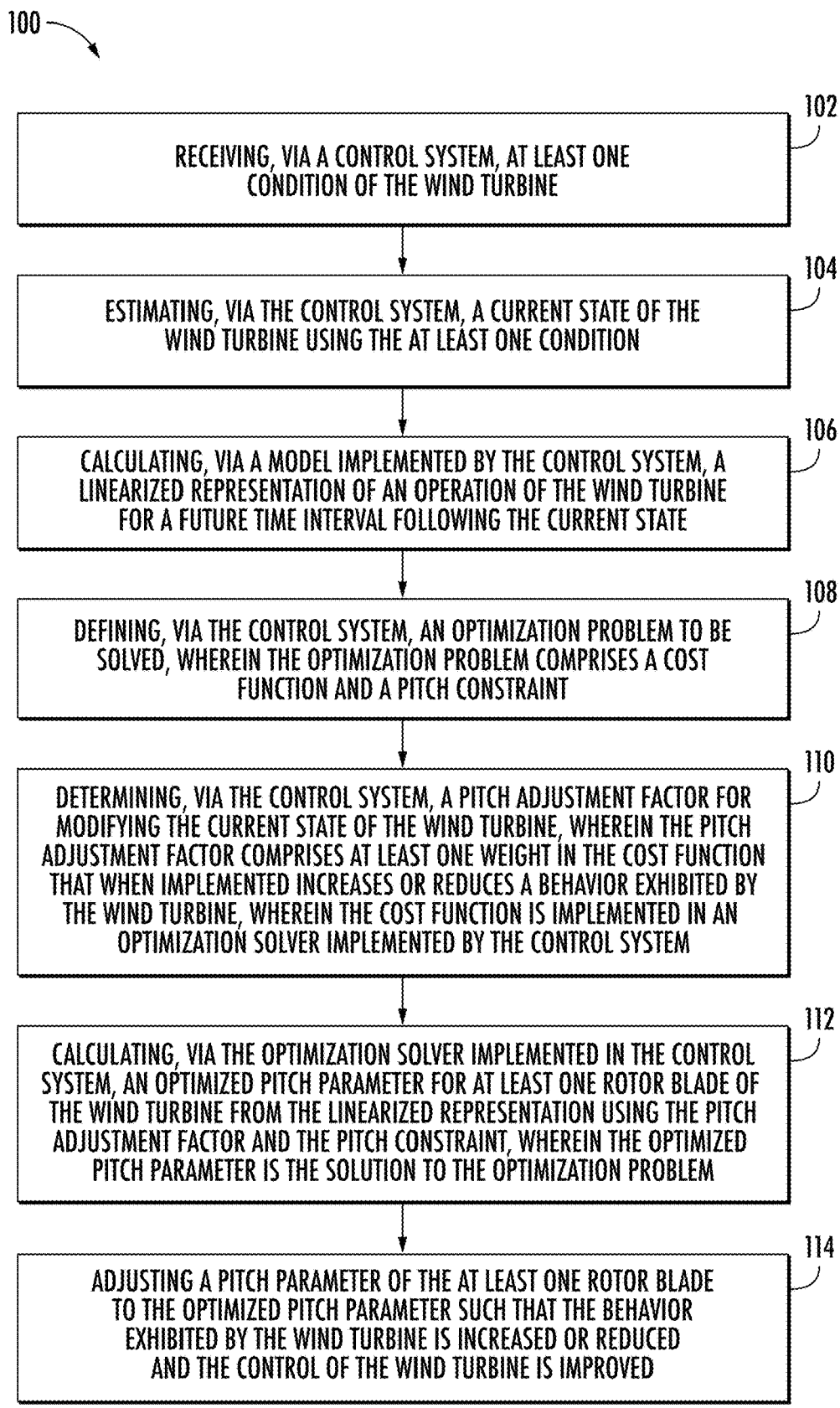
FIG. 6 illustrates a flow chart of an embodiment of a method for optimizing control of a wind turbine according to the present disclosure.

Referring now to FIG. 6, a flow diagram of an embodiment of a method 100 for optimizing pitch control of a wind turbine is illustrated according to the present disclosure. In an embodiment, for example, the pitch control may be optimized by using, for example, the control system 26, one or more of the rotor blades 22, the pitch bearing 46, and/or the hub 20 of the wind turbine 10. The method 100 is described herein as implemented using, for example, the wind turbine 10 described above. However, it should be appreciated that the disclosed method 100 may be implemented using any other suitable wind turbine now known or later developed in the art. In addition, although FIG. 6 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown at (102), the method 100 includes receiving, via a control system 26, at least one condition of the wind turbine 10. For example, in an embodiment, the condition(s) may be one or more of rotor speed, generator speed, wind speed, wind direction, wind shear, wind veer, wind turbulence, structural forces or moments, structural displacements, structural velocities, structural accelerations, or similar. Such conditions may be detected by the sensors 48, 50 provided with the wind turbine 10 or any other sensor communicatively coupled with the wind turbine 10. The conditions may also be detected using sensors (not shown) that are external to the wind turbine 10.

As shown at (104), the method 100 includes estimating, via the control system 26, a current state of the wind turbine 10 using the condition(s). For example, in an embodiment, the current state of the wind turbine 10 may include an instantaneous aerodynamic effect distributed across a portion of the wind turbine 10 such as at least one of the rotor blades 22. Specifically, the instantaneous aerodynamic effect may include the forces and moment loads described above such as the blade root resultant force (e.g., $F_{rB}$), the pitch and hub forces ($F_{xB}$, $F_{yb}$, and $F_{zb}$), the blade root resultant moment load (e.g., $M_{rB}$), or the pitch and hub moment loads ($M_{xB}$, $M_{yb}$, and $M_{zb}$). The instantaneous aerodynamic effect may be calculated from the pitch of each of the rotor blades 22 of the wind turbine 10, and the torque exerted upon the rotor blades 22, and the wind forces acting upon the wind turbine 10 such as wind speed, wind direction, vertical shear, horizontal shear, veer, or turbulence. However, if it is not possible to determine the wind forces (due to a lack of sensors, for example) the wind forces may be estimated for the purpose of calculating the instantaneous aerodynamic effect.

The current state of the wind turbine 10 may also include an instantaneous structural effect across a portion of the wind turbine 10 such as the tower 12 or the nacelle 16. Specifically, the instantaneous structural effect may include at least one of a structural displacement, a structural velocity, or a structural acceleration of any structural component of the wind turbine 10. For example, the instantaneous structural effect may include the main shaft forces (e.g. $F_{yr}$, $F_{zr}$), the main bearing forces (e.g. $F_{xr}$, $F_{yr}$), the yaw drive forces (e.g. $F_{xk}$), the yaw bolts/bearing/flange forces (e.g. $F_{yk}$, $F_{zk}$), the tower bending forces (e.g. $F_{xt}$, $F_{yt}$, and $F_{zt}$), the main shaft moment loads (e.g. $M_{yr}$, $M_{zr}$), the main bearing moment loads (e.g. $M_{xr}$, $M_{yr}$), the yaw drive moment loads (e.g. $M_{xr}$), the yaw bolts/bearing/flange moment loads (e.g. $M_{yk}$, $M_{zk}$), or the tower bending moment loads (e.g. $M_{xt}$, $M_{yt}$, and $M_{zt}$). The instantaneous structural effect may also be calculated from the pitch of each of the rotor blades 22 of the wind turbine 10, and the torque exerted upon the rotor blades 22, and the wind forces acting upon the wind turbine 10 such as wind speed, wind direction, vertical shear, horizontal shear, veer, or turbulence. Also, like the instantaneous aerodynamic forces, the instantaneous structural effect the wind forces may be estimated for the purpose of calculating the instantaneous aerodynamic effect if it is not possible to determine the wind forces (due to a lack of sensors, for example).

Figure 7:
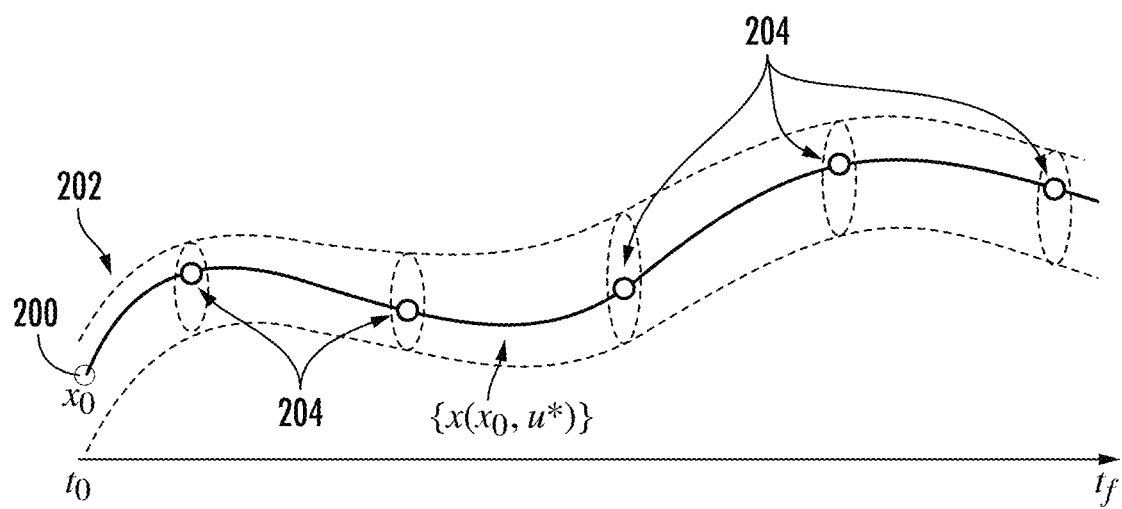
FIG. 7 illustrates a graph of an embodiment of a current state being estimated from a condition of the wind turbine and a linearized representation of the operation of the wind turbine being calculated for a future time interval following the current state according to the present disclosure.

As shown at (106), the method 100 includes calculating, via a model implemented by the control system 26, a linearized representation of an operation of the wind turbine 10 for a future time interval following the current state. In particular, linearized representation of the operation of the wind turbine 10 for a future time interval may define an expected state of the wind turbine 10. Further, the expected state may be defined as a set of magnitudes that completely characterize the dynamics of the wind turbine 10 (represented by the model). In particular, as shown in FIG. 7, the current state 200 of the wind turbine 10 may be received by the control system 26. The control system 26 can thus simulate an expected state 202 using the current state 200 for a future time interval of the wind turbine 10. For example, the expected state 202 may be calculated from an input trajectory u* and the current state 200. The input trajectory u* may be provided for any interval in time that is to be simulated, such as the observable time intervals by the control system 26 described hereinabove with reference to the future time interval.

The input trajectory u* may include a prediction of the factors which were used to calculate instantaneous aerodynamic or structural effects acting on the wind turbine 10 (i.e., the pitch of each of the rotor blades 22 of the wind turbine 10, and the torque exerted upon the rotor by the generator, and the wind forces acting upon the wind turbine 10 such as wind speed, wind direction, vertical shear, horizontal shear, veer, or turbulence). However, if it is not possible to determine the wind forces (due to a lack of sensors, for example) the wind forces may also be estimated to set the input trajectory u* to the instantaneous aerodynamic or structural effect. If, however, the wind forces are estimated, the estimation will be used for each of the intervals of time for which the input trajectory u* is provided. In addition, as the expected state 202 advances in time, the input trajectory or trajectories u* from a previously optimization instance(s) in time will be used with the input trajectory u* for the instance in time to be simulated to provide the output for the expected state 202 at the new instance in time. These collections of input trajectories u* provided with the current state 200 can then be used to calculate further expected states 202 as represented by the plot shown in FIG. 7.

In addition, as stated above, one or more linearized representation of the operation of the wind turbine 10 may also be provided. The linearized representation(s) may be determined at a sample time interval, such as the time intervals 204. However, the linearized representation(s) may also be provided at any time of the expected state 202. The linearized representation(s) may be a matrix or matrices that are representative of the expected behavior of the wind turbine 10 at a certain period of time in advance (i.e., a future time interval) of when the linearized representation is initially determined, such as at time intervals 204. Once determined, the linearized representation(s) may be collected and used within the model to implement later functionalities or calculations as will be discussed hereinbelow.

In an alternative embodiment, the linearization process may be obtained without the need of simulating the model. If the optimization problem used in the predictive controller is a nonlinear Programming Problem (NLP), the model could be linearized not just before executing the optimization solver, but also during the optimization process. In order to accelerate convergence, the NLP solver algorithm may need to linearize the model at every iteration of the solver.

Returning back to FIG. 6, as shown at (108), the method 100 further includes defining, via the control system, an optimization problem to be solved. The optimization problem may include a cost function and a pitch constraint. In an embodiment, the cost function may be Equation (1) provided below:

$$J = \sum_{k=1}^{N} \tag{1}$$

$$\left( \sum_{j=1}^{n_{yp_{in}}} W_u(j)(y_{p_{in}}(j) - y_{p_{in}}^{ref}(j))^2 + \sum_{j=1}^{n_{yp_{in}}} W_y(j)(y_{p_{out}}(j) - y_{p_{out}}^{ref}(j))^2 + \sum_{j=1}^{n_{yc_{out}}} w_\epsilon^U(j)\epsilon_U(j) + \sum_{j=1}^{n_{yc_{out}}} w_\epsilon^L(j)\epsilon_L(j) \right)$$

$n_{yc_{out}}$ is the number of constraint signals associated with the outputs from the model, $n_{yp_{in}}$ is the number of performance signals associated with the inputs to the model, $y_{p_{in}}(j)$ is the j-th performance signal associated with the inputs to the model (in particular the pitch motion such as angle, rate, acceleration can be an input performance signal), $y_p^{ref\,in}$ (i) is the reference value to the signal $y_{pin}(j)$, $y_{pin}$ $W_u$ (j) is the weight for the difference between input signals and their corresponding reference values, $Y_{p_{out}}$ (j) is the j-th performance signal associated with the outputs to the model (e.g., any load magnitude such as moments or forces at any location of the turbine structure, or any outcome of the turbine operation such as power generated, or rotor speed), ref (i) is the reference value for the signal $y_{pout}$ (j), $W_y$ (j) is the weight for the difference between output signals and their corresponding reference values, $\in_u$ (j) is the slack variable corresponding to any upper bound constraint, $w_\epsilon^U(j)$ is the weight for the slack variable $\in_U$ (j), $\in_L$ (j) is the slack variable corresponding to any lower bound constraint, and $w_\epsilon^L$ (j) is the weight for the slack variable $\in_L$ (j).

The solution to the optimization problem, which will be described in greater detail hereinbelow, may involve finding specific weights and slack variables that correspond with pitch constraints that minimize the output J of the cost function. In addition, the cost function may be implemented in an optimization solver implemented by the control system 26. The optimization solver may be any type of algorithm, program, or software, such as the optimization module 76, that will determine values that result in the minimization of the output of the cost function. The pitch constraint, which will also be described in greater detail hereinbelow, may be any statement that when implemented sets a maximum or minimum for a value related to the pitch of the rotor blades 22 of the wind turbine 10 when input into the model implemented by the control system 26. These maximum or minimum values may be absolute values or they may be values that are adapted that may change based on real-time data analytics.

As shown at (110), the method 100 further includes determining, via the control system 26, a pitch adjustment factor for modifying the current state of the wind turbine 10. A pitch adjustment factor may be an algorithm, formula, or rule that, when input into the model implemented by the control system 26, promotes or discourages an outcome as it relates to pitch control of the wind turbine 10. For example, the pitch adjustment factor may include one or more weight(s) in the cost function (i.e., Equation (1)) that when implemented increases or reduces a behavior exhibited by the wind turbine. The pitch adjustment factor may also include terms in the cost function such as the performance signals and reference signals, or the results derived from the use of the performance signals and reference signals, These terms may relate to the control of factors such as whether symmetric pitching or non-symmetric pitching is implemented or whether harmonic activity is reduced. As it relates to Equation (1), the pitch adjustment factor, when utilized, may also result in the minimization of the output J of the cost function.

Multiple pitch adjustment factors, such as two or more pitch adjustment factors, may be determined which together may promote or discourage an outcome or multiple outcomes as it relates to pitch control of the wind turbine 10. For example, referring now to FIG. 8, a graph of an embodiment of a multi-objective model of determining an optimized state 308 of the wind turbine 10 is illustrated according to the present disclosure. Operating the wind turbine 10 at the optimized state 308 may be achieved by providing an optimized pitch parameter as will be described in greater detail hereinbelow. Generally, the optimized state may be representative of the control of the wind turbine 10 being improved or a behavior exhibited by the wind turbine being reduced.

Figure 8:
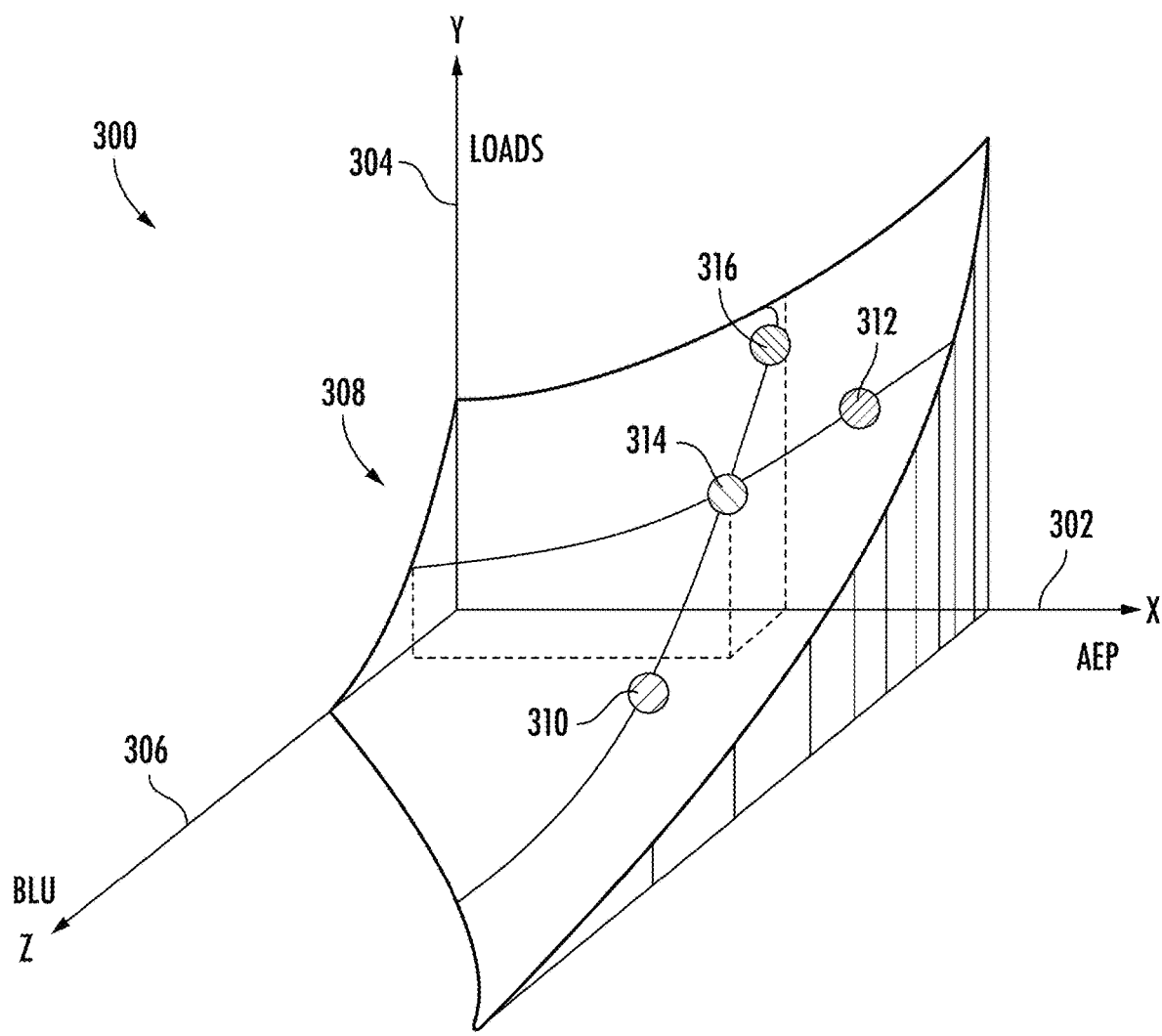
FIG. 8 illustrates a graph of an embodiment of a multi-objective model for determining an optimized pitch parameter of the wind turbine according to the present disclosure.

As shown in FIG. 8, the outcomes or outputs of the multi-objective model 300 are provided along the axes of the multi-objective model 300. Specifically, the first possible output, provided on the x-axis 300, is the optimization of annual energy production (AEP) of the wind turbine 10, i.e., increasing the AEP of the wind turbine. The second possible output, provided on the y-axis 304, is optimization of the loads acting upon the wind turbine 10, i.e., decreasing the total loads acting upon the wind turbine 10. As described, the loads to be optimized may be any loads acting on the wind turbine 10 such as fatigue loads or extreme/peak loads. The third possible output, provided on the z-axis 306, is the optimization of the bearing lifetime utilization (BLU), i.e., increasing the bearing life for the wind turbine 10 by decreasing the utilization of the bearing life.

Thus, as shown, the optimized state 308 of the pitch parameter may result in a decrease in a load acting on the wind turbine 10, a decrease in the utilization of the bearing life (such as the bearing life of pitch bearing 46), and/or an increase in AEP. Specifically, a singular output may be achieved while mitigating deleterious effects by not emphasizing other outputs. Such outputs may be readily observed with respect to a starting point 314. For example, as shown at point 316, the control system 26 may promote a maximum reduction in bearing life utilization while maintaining AEP with respect to point 314. At point at 312, a maximum increase in AEP may be provided while mitigating the overall bearing life utilization necessary for such an increase with respect to point 314. At point 310, loads may be minimized, while maintaining AEP with respect to point 314. In addition to reducing loads, reducing bearing life utilization, or increasing energy production, the use of pitch adjustment factors may also provide an increase in power quality (i.e., a reduction in the level of power oscillations or harmonics), an increase in power tracking performance, or an increase in speed tracking performance. Each of these improvement to the control of the wind turbine 10 may be achieved through the use of the pitch adjustment factors and pitch constraints as described herein.

For example, in an embodiment, the pitch adjustment factor may be a weight on symmetric pitch activity or non-symmetric pitch activity. As described, symmetric or collective pitch is defined as when all rotor blades 22 have the same pitch motion. In contrast, non-symmetric or cyclic pitching is when the rotor blades 22 have different pitch motion from each other. Symmetric pitch activity may be controlled through the use of Equations (2)-(4) below, respectively:

$$P_{sym} = W \sum \left( \frac{\theta_{1k} + \theta_{2k} + \theta_{3k}}{3} \right)^2 \quad (2)$$

$$P_{sym} = W \sum \left( \frac{\dot{\theta}_{1k} + \dot{\theta}_{2k} + \dot{\theta}_{3k}}{3} \right)^2 \quad (3)$$

$$P_{sym} = W \sum \left( \frac{\ddot{\theta}_{1k} + \ddot{\theta}_{2k} + \ddot{\theta}_{3k}}{3} \right)^2 \quad (4)$$

Where W is a weight factor,
$\theta_{1k}$, $\theta_{2k}$, and $\theta_{3k}$ are the pitch angles of each rotor blade 22,
$\dot{\theta}_{1k}$, $\dot{\theta}_{2k}$, $\dot{\theta}_{3k}$ are the pitch rates of each rotor blade 22, and
$\ddot{\theta}_{1k}$, $\ddot{\theta}_{2k}$, $\ddot{\theta}_{3k}$ are the pitch accelerations of each rotor blade 22.

As shown, when the weight factor W is increased, the symmetric pitch activity of the wind turbine 10 may be reduced. Conversely, when the weight factor W is decreased, the symmetric pitch activity of the wind turbine 10 may be increased.

In contrast to the symmetric pitch control provided with Equations (2)-(4), non-symmetric pitch activity may be controlled through the use of Equations (5)-(7) below, respectively:

$$P_{non-sym} = W \sum \left( \theta_{ik} - \left( \frac{\theta_{1k} + \theta_{2k} + \theta_{3k}}{3} \right) \right)^2 \quad (5)$$

$$P_{non-sym} = W \sum \left( \dot{\theta}_{ik} - \left( \frac{\dot{\theta}_{1k} + \dot{\theta}_{2k} + \dot{\theta}_{3k}}{3} \right) \right)^2 \quad (6)$$

$$P_{non-sym} = W \sum \left( \ddot{\theta}_{ik} - \left( \frac{\ddot{\theta}_{1k} + \ddot{\theta}_{2k} + \ddot{\theta}_{3k}}{3} \right) \right)^2 \quad (7)$$

Where W is a weight factor,
$\theta_{1k}$, $\theta_{2k}$, and $\theta_{3k}$ are the pitch angles of each rotor blade 22,
$\theta_{ik}$ represents the pitch angle of the i-th rotor blades 22 at the k-th time step within the prediction horizon,
$\dot{\theta}_{1k}$, $\dot{\theta}_{2k}$, and $\dot{\theta}_{3k}$ are the pitch rates of each rotor blade 22,
$\dot{\theta}_{ik}$ represents the pitch rate of the i-th rotor blades 22 at the k-th time step within the prediction horizon, $\ddot{\Theta}_{1k}$, $\ddot{\Theta}_{2k}$, and $\ddot{\Theta}_{3k}$ are the pitch accelerations of each rotor blade 22, and $\ddot{\Theta}_{ik}$ represents the pitch acceleration of the i-th rotor blades 22 at the k-th time step within the prediction horizon.

As shown, when the weight factor W is increased, the non-symmetric pitch activity of the wind turbine 10 may be reduced. Conversely, when the weight factor W is decreased, the non-symmetric pitch activity of the wind turbine 10 may be increased.

Figure 9A:
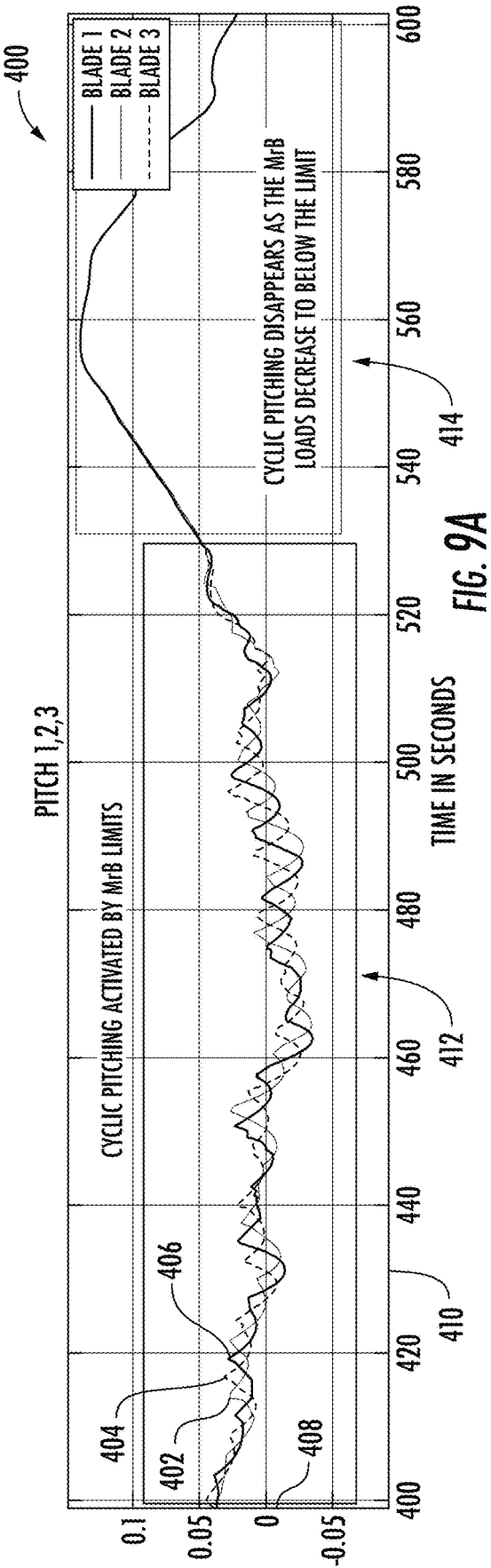
FIGS. 9A-9B illustrate graphs of the effects of adjusting a pitch parameter of a rotor blade of a wind turbine to an optimized pitch parameter using a weight that corresponds to symmetric or non-symmetric pitching motion according to the present disclosure.
Figure 9B:
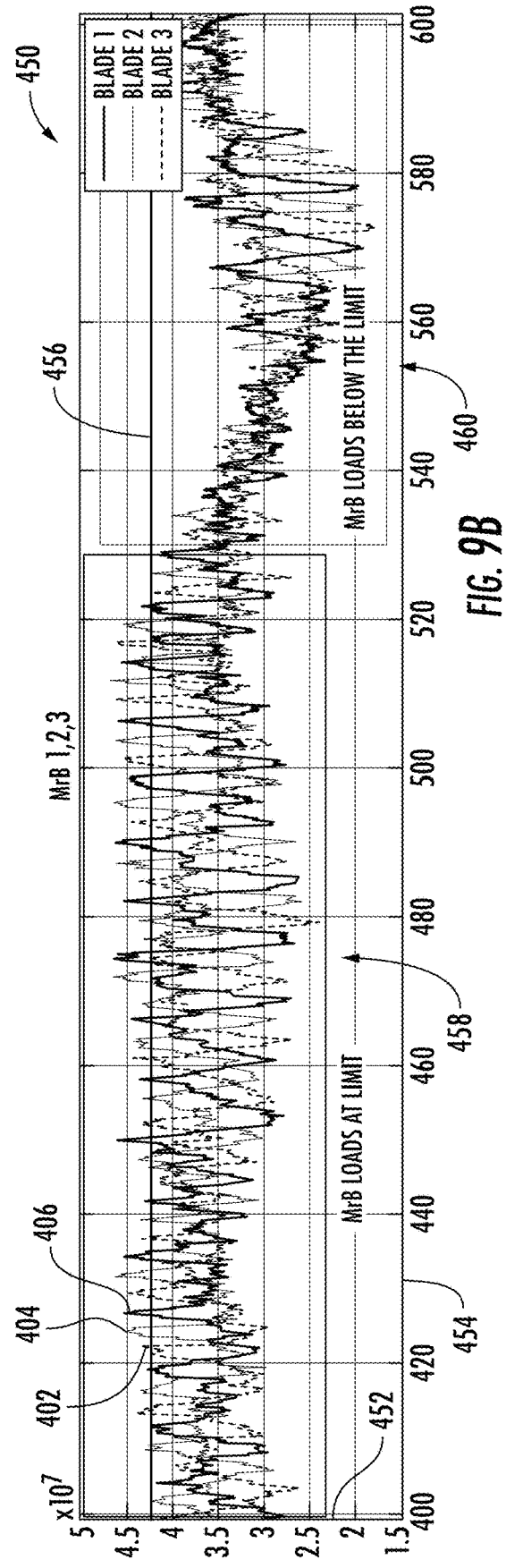

Referring now to FIGS. 9A and 9B, graphs of the effects of pitch adjustment factors being applied to provide non-symmetric pitching and symmetric pitching. As shown in FIG. 9A, a plot 400 of the pitch of each rotor blade 402, 404, 406 is provided. As shown in FIG. 9B, a plot 450 of the loads placed upon the same rotor blades 402, 404, 406 is provided. In particular, in FIG. 9A, the pitch of each rotor blade 402, 404, 406 is provided on y-axis 408 and is plotted with time which is placed on the x-axis 410 of the plot 400. In FIG. 9B, the loads placed on each rotor blade 402, 404, 406 is provided on the y-axis 452 and is plotted with the same time as FIG. 9A, which is placed on the x-axis 454 of the plot 450.

Further, as shown in FIG. 9B, the loads exerted on the rotor blades 402, 404, 406 is shown as exceeding a threshold 456 within the box 458. To address this, the control system 26 may activate non-symmetric or cyclic pitching for the rotor blades 402, 404, 406 as shown in box 412 of FIG. 9A. Specifically, by activating the non-symmetric or cyclic pitching, a decrease in the weight W provided in Equations (5)-(7) is implemented. As a result, a difference in pitch angle between the rotor blades 402, 404, 406 is provided which results in the rotor blades 402, 404, 406 operating out of phase with each other as shown in box 412. As a result of this difference in pitch between the rotor blades 402, 404, 406, the loads placed upon the rotor blades 402, 404, 406 decrease below the threshold 456 as shown in box 460. Thus, loads may be reduced through the use of non-symmetric or cyclic pitching which results in an increase in a difference in a pitch angle between the rotor blades 402, 404, 406. In addition, as shown in FIGS. 9A and 9B, once the loads placed upon the rotor blades 402, 404, 406 are below the threshold 456, symmetric pitching may be utilized as shown in box 414. Because the load reduction is achieved with non-symmetric pitching, this strategy results in additional power production over the standard approach of handling blade loads through increasing collective pitching. In this way, a proper combination of weights on the symmetric and non-symmetric pitching can achieve a desired behavior of utilizing cyclic pitching when it is critical to reduce loads, and using symmetric pitching otherwise.

Accordingly, through the use of the weights W within Equations (2)-(7), it is feasible to fine tune the pitch parameters of the wind turbine 10 and the rotor blades 22 such that the optimal tradeoff between is achieved between loads mitigation, BLU saving and energy production. Precisely, through the utilization of these increases or decreases in the cost function, optimal utilization of collective or non-symmetric pitch action may be achieved to address any particular load constraint. Further customization can be achieved by scheduling the weight factor according to some operating parameter, such as wind speed or wind turbulence intensity.

In another embodiment, the pitch adjustment factor may correspond to an amplitude of harmonics higher than a fundamental frequency of a pitch angle, pitch rate, or pitch acceleration. Specifically, the pitch adjustment factor may be a weight, that when applied, decreases the amplitude of harmonics higher than a fundamental frequency of a pitch angle, pitch rate, or pitch acceleration. For example, the harmonics may be controlled through the use of Equation (8) below:

$$P_\lambda = W_s\left(\sum \theta_k \sin\lambda \frac{k}{2\pi}\right)^2 + W_c\left(\sum \theta_k \cos\lambda \frac{k}{2\pi}\right)^2 \qquad (8)$$

Where $W_s$ and $W_c$ are each weight factors, $\theta_k$ is equal to the pitch angle of a rotor blade 22 (pitch rates and pitch accelerations may also be utilized), $\lambda$ is the wavelength, and k is the k-factor.

By providing weights which decrease the amplitude of harmonics higher than a fundamental frequency higher order harmonics may either be reduced or entirely eliminated from being exhibited by the rotor blades 22 of the wind turbine 10. If desired, the weight may be applied to all of the rotor blades 22. Alternatively, if a particular rotor blade 22 operates at a higher frequency for its pitch angle, pitch rate, or pitch acceleration when compared to a second rotor blade 22, the decrease may be applied to the particular rotor blade 22 utilizing the higher frequency.

In an example, when higher order harmonics in pitch activity are utilized, which can drive excessive BLU, proper selection of the weights $W_s$ and $W_c$ allow the penalization of specific Fourier components of the pitch trajectories, which is relevant for pitch bearing life management. Specifically, when weights $W_s$ and $W_c$ are increased the amplitude of higher order harmonics may be reduced. Thus, the pitch bearing life may be improved through selecting a pitch adjustment factor that results in a decrease in an amplitude of harmonics higher than the fundamental frequency of a pitch angle, pitch rate, or pitch acceleration. For example, if the user needs to remove a harmonic component from the pitch trajectory, a user may employ Equation (8) to penalize these higher order harmonics by increasing weights $W_s$ and Wc.

Figure 10A:
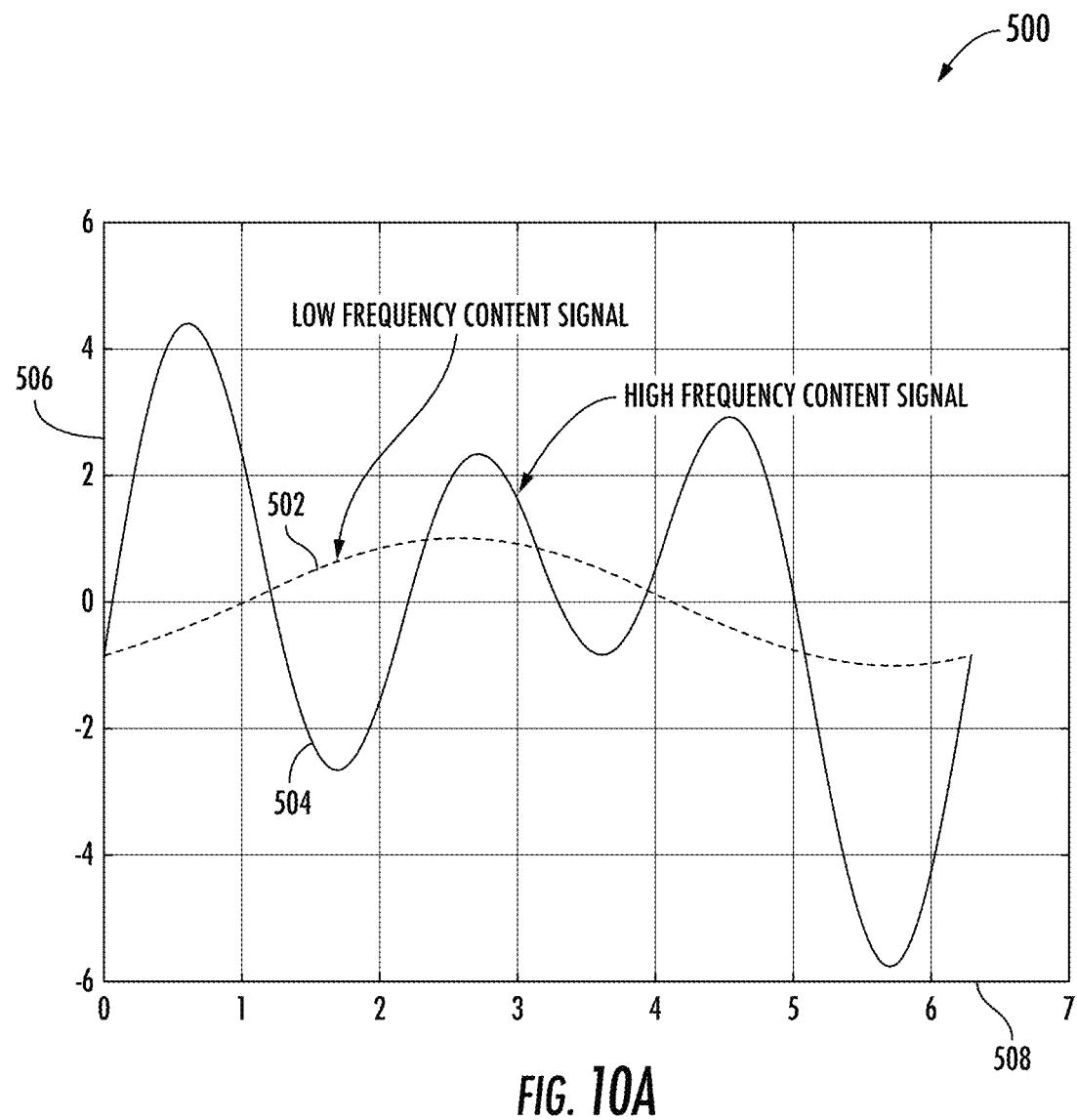
FIG. 10A-10D illustrate graphs of the effects of adjusting a pitch parameter of a rotor blade to an optimized pitch parameter using a weight that corresponds to an amplitude of harmonics higher than a fundamental frequency of a pitch angle, a pitch rate, or a pitch acceleration of a rotor blade of a wind turbine according to the present disclosure.
Figure 10B:
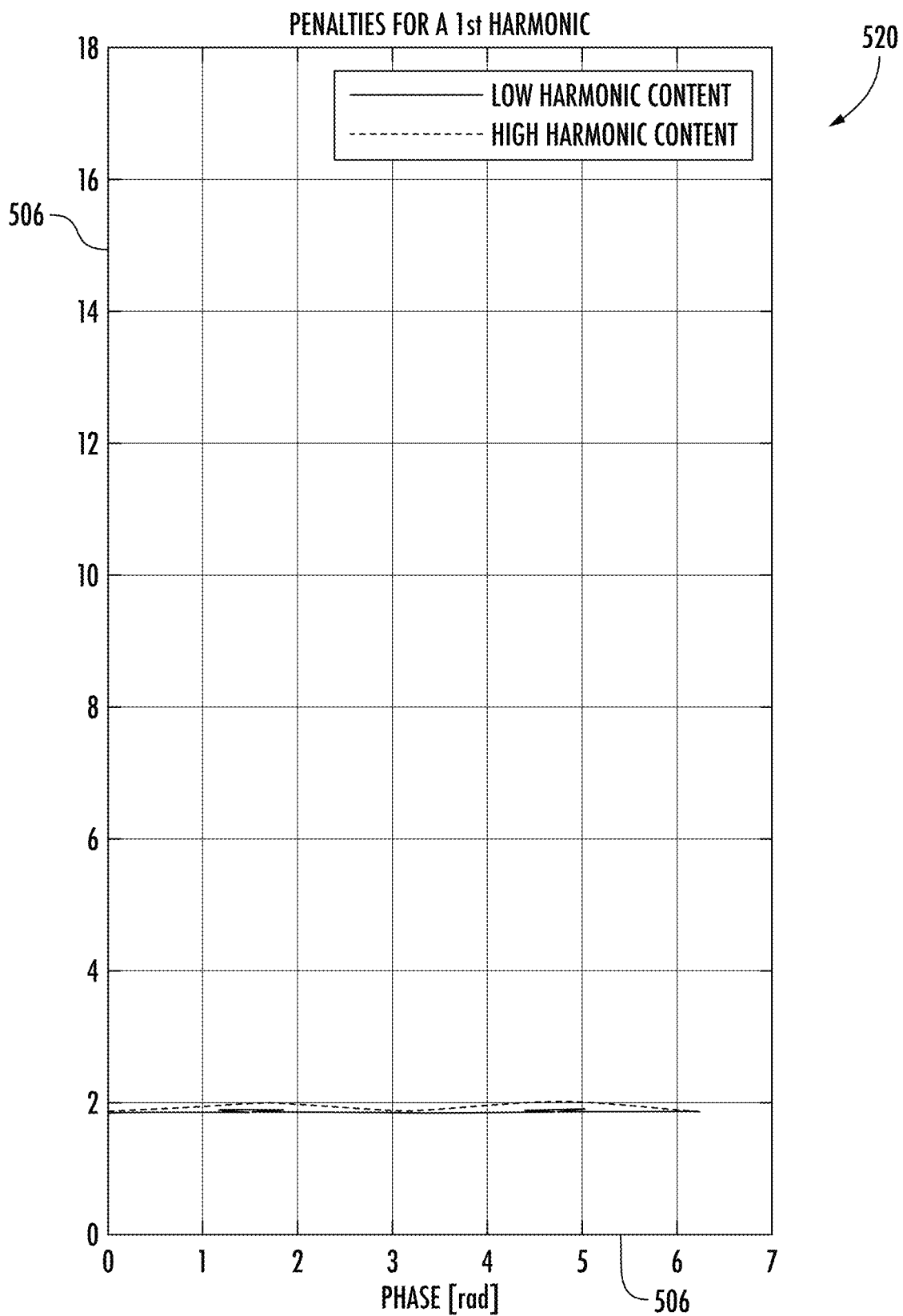
Figure 10C:
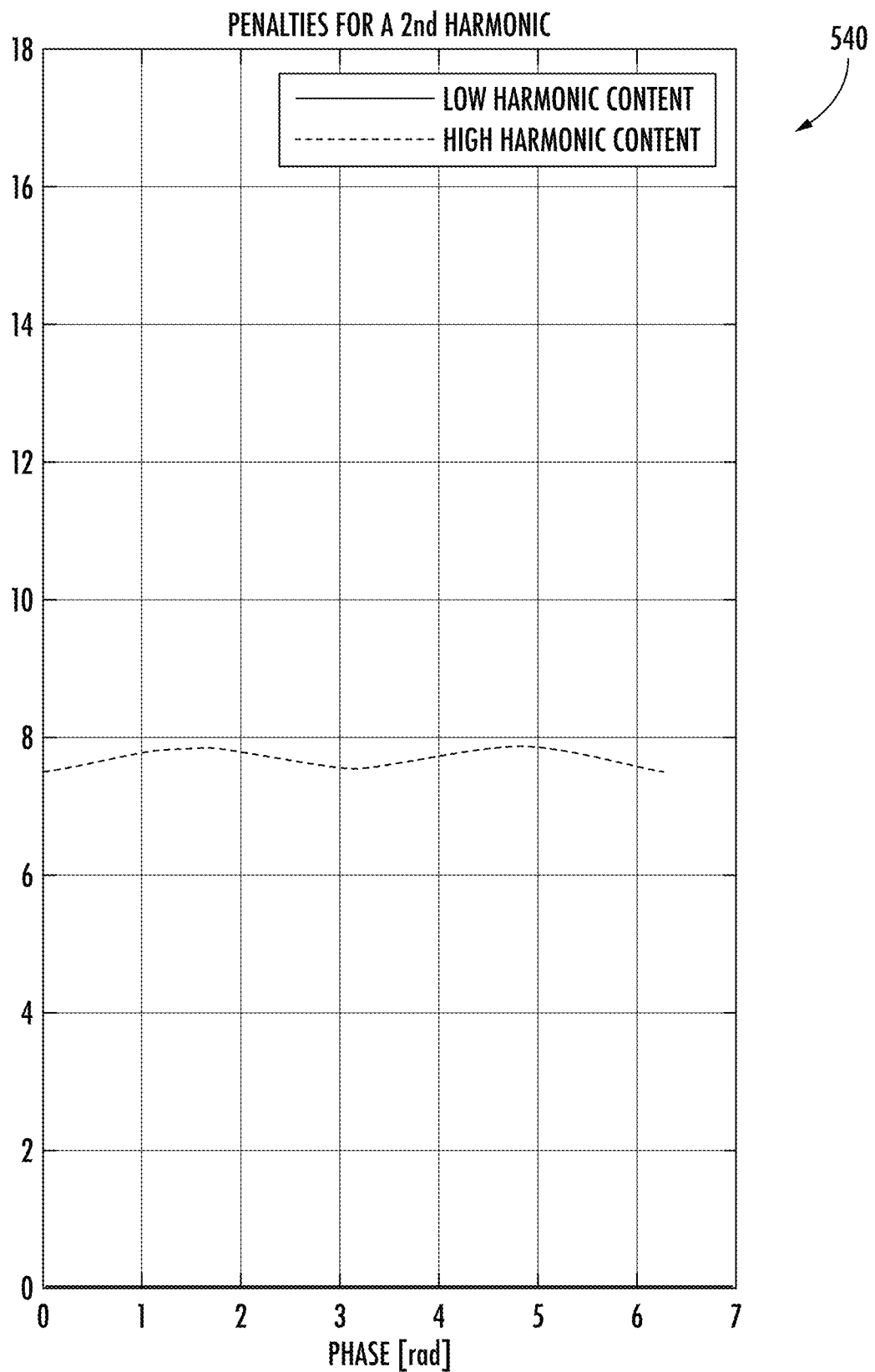
Figure 10D:
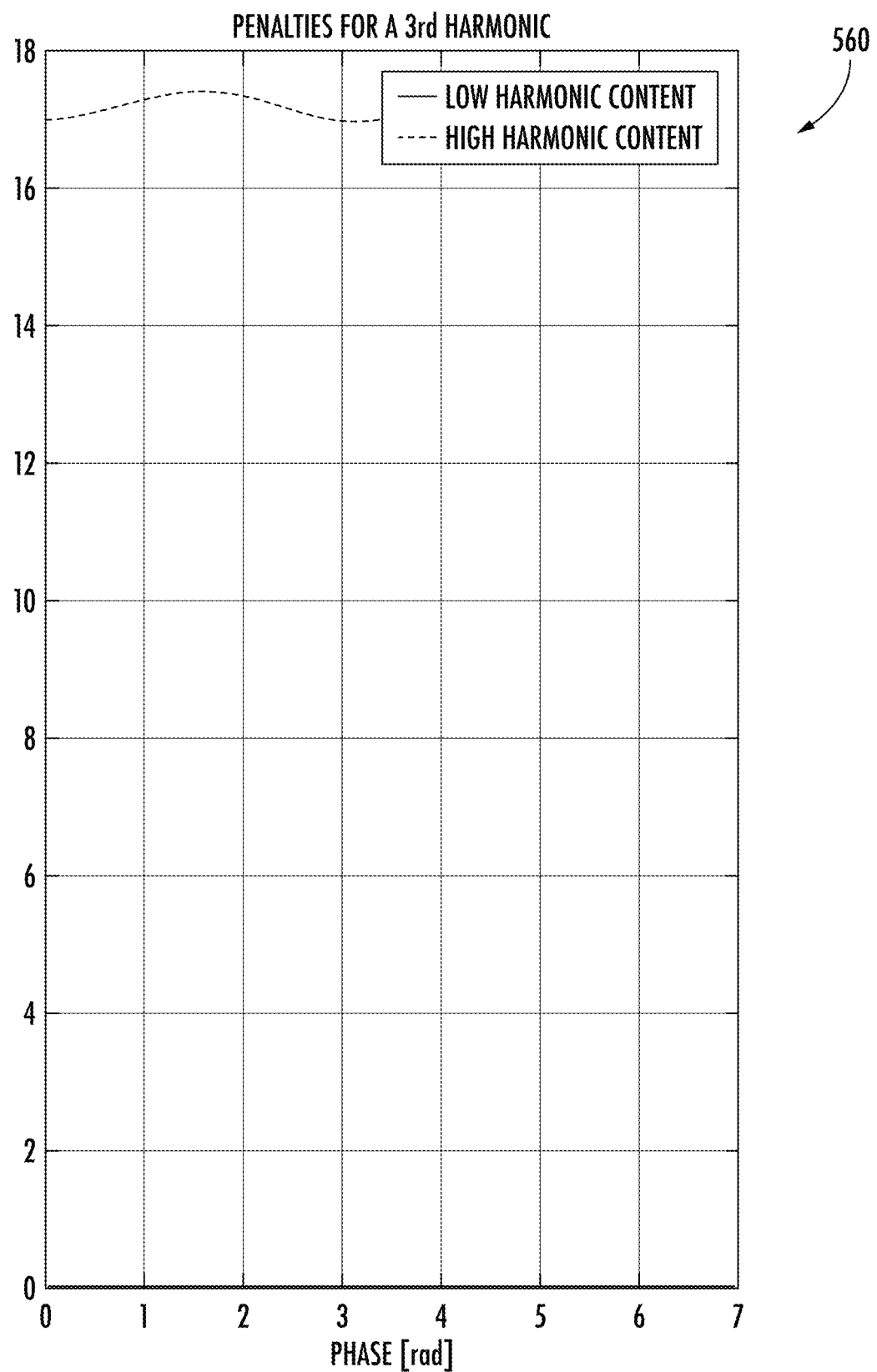

Specifically, and referring to FIGS. 10A-10D, various graphs illustrating the effectiveness of Equation (8) in discriminating high harmonic components of pitch signal are illustrated. FIG. 10A illustrates a plot 500 providing fundamental frequencies for a high frequency signal 502 and a low frequency signal 504 for the pitch angle, pitch rate, or pitch acceleration of one or more of the rotor blades 22, while FIGS. 10B-10D illustrates plots 520, 540, 560 providing the first order harmonics, the second order harmonics, and the third order harmonics of the fundamental frequencies of the high frequency signal 502 and the low frequency signal 504. Specifically, for each of the plots 500, 520, 540, 560 provided in FIGS. 10A-10D, the y-axis 506 is the pitch angle of one or more of the rotor blades 22, while the x-axis 508 is the phase of the one or more rotor blades 22.

In addition, as shown, the plots 520, 540, 560 of FIGS. 10B-10D show Equation (8) being applied to the first, second and 3rd harmonics for the two signals 502, 504. Specifically, as shown, the application of Equation (8) to the first order harmonics is low. In addition, at the first order harmonics shown in plot 520 of FIG. 10B, the penalties are equivalent or about the same for the high frequency signal 502 and the low frequency signal 504. However, as shown in plots 540, 560 of FIGS. 10C-10D, the second and third harmonics are practically zero for the low frequency signal 504, while they are high for the high frequency signal 502. Thus, it can be seen that through the selection of weights $W_s$ and $W_c$ within Equation (8), higher order harmonics of higher frequency signals may be reduced or entirely eliminated. Accordingly, higher order harmonics of higher frequency signals may be reduced, and consequently, the pitch bearing life of wind turbines 10 may be improved.

In another embodiment, the pitch adjustment factor may be linear or quadratic penalty terms at the future time interval. For example, a linear penalty term may be provided at the future time interval through the use of Equation (9) below:

$$P = \Sigma \theta_k w_k \quad (9)$$

Where $\theta_k$ is equal to the pitch angle and
$W_k$ is a weight factor.

In addition, a quadratic penalty term may be provided at the future time interval through the use of Equation (10) below:

$$P = (\Sigma \theta_k w_k)^2 \quad (10)$$

Where $\theta_k$ is equal to the pitch angle and
$W_k$ is a weight factor.

Both the linear and quadratic penalty terms may be applied at any time interval for the future time interval. For example, the penalty terms may be applied at the sample times 204 (FIG. 7). In addition, the linear and quadratic penalty terms may vary across multiple time intervals. It should be understood, however, that although the term "penalty" is used, a corresponding reward may also be utilized that encourages an activity or increases a behavior exhibited by the wind turbine 10.

In another embodiment, the pitch constraints may be linear or quadratic constraints at the future time interval. For example, a linear constraint may be provided at a future time interval through the use of Equation (11) below:

$$LB \leq \Sigma \theta_k w_k \leq UB \quad (11)$$

Where $\theta_k$ is equal to the pitch angle,
$W_k$ is a weight factor,
LB is a lower bound, and
UB is an upper bound.

In addition, a quadratic constraint may be provided at a future time interval through the use of Equation (12) below:

$$LB \leq \Sigma (\theta_k w_k)^2 \leq UB \quad (12)$$

Where $\theta_k$ is equal to the pitch angle,
$W_k$ is a weight factor,
LB is a lower bound, and
UB is an upper bound.

Like the penalty terms, the linear and quadratic constraints may also be provided at multiple future time intervals and vary across multiple future time intervals.

In another embodiment, the pitch adjustment factor may also include a variance or a tracking for a pitch angle, a pitch rate, or a pitch acceleration of one or more of the rotor blades 22.

Each of these penalties, constraints, variances, or trackings may provide finer tuning of any of the other pitch adjustment factors provided. Specifically, by providing any of the penalty terms or constraints corresponding to Equations (9)-(12), utilization of other pitch adjustment factors may be more efficiently controlled.

In another embodiment, the pitch constraint may be a maximum or a minimum allowable pitch angle, pitch rate, or pitch acceleration for at least one rotor blade 22. For example, maximum or minimum allowable pitch angle, pitch rate, or pitch accelerations may be implemented through the use of Equations (13)-(15), respectively:

$$LB \leq \theta_{ik} \leq UB \quad (13)$$

$$rLB \leq \dot{\theta}_{ik} \leq rUB \quad (14)$$

$$aLB \leq \ddot{\theta}_{ik} \leq aUB \quad (15)$$

Where $\theta_{ik}$ is equal to the pitch angle,
$\dot{\theta}_{ik}$ is the pitch rate,
$\ddot{\theta}_{ik}$ is the pitch acceleration,
LB, rLB, and aLB are lower bounds for the pitch angle, pitch rate, and pitch acceleration, respectively, and
UB, rUB, and aUB are upper bounds for the pitch angle, pitch rate, and pitch acceleration, respectively.

Through the use of maximum or minimum allowable pitch angles, pitch rates, or pitch accelerations, as described herein, physical limitations or caps may be applied to the pitch activity of the rotor blades 22. Specifically, through the utilization of Equations (11)-(13), the maximum or minimum allowable pitch angles, pitch rates, or pitch accelerations may be set. As described, the maximum or minimum allowable pitch angles, pitch rates, or pitch accelerations may be modified based on a protection logic. For example, if conditions, such as wind conditions, necessitate a lower maximum allowable pitch angle, pitch rate, or pitch acceleration, the control system 26 may include a protection logic, enacted by the control system 26, which instructs the wind turbine 10 to reduce the maximum pitch angle, pitch rate, or pitch acceleration. Thus, according to the conditions existing around the wind turbine 10, the protection logic may raise or lower the maximum and minimum allowable pitch angle, pitch rate, or pitch acceleration of the rotor blades 22 of the wind turbine 10. Further, if the conditions which resulted in the protection logic being implemented no longer exist, the control system 26 may revert the maximum or minimum allowable pitch angle, pitch rate, or pitch acceleration of the rotor blades 22 to return to their values prior to the protection logic being implemented. Thus, it is understood that the protection logic may be temporarily activated depending on the conditions existing around the wind turbine 10.

In another embodiment, the pitch constraint may correspond with a maximum or a minimum allowable pitch motor torque, current, voltage, or power. Such constraints may provide protection for the electrical components such as the pitch drive motor 40 of the wind turbine 10.

In addition, if flexibility in these maximum or minimum allowable values is desired, increases or decreases of the input or output constraints may be utilized. For example, an increase or decrease in a maximum pitch angle, pitch rate, or pitch acceleration or an increase or decrease in a minimum pitch angle, pitch rate, or pitch acceleration may be provided. In another example, an increase or decrease in a maximum of the allowable pitch motor torque, current, voltage, or power or an increase or a decrease in a minimum allowable pitch motor torque, current, voltage, or power may be provided. The increases or decreases may be applied at a future time interval or multiple future time intervals and vary across multiple future time intervals where the inequalities defining the constraints may be required to be satisfied at each future interval or multiple future time intervals. For example, an increase of the input and output constraints may be provided according to Equation (16) below:

$$LB_{y_{c_{in}}} \le y_{c_{in}} \le UB_{y_{c_{in}}} \quad (16)$$

$$LB_{y_{c_{out}}} - \epsilon_L \le y_{c_{out}} \le UB_{y_{c_{out}}} + \epsilon_U$$

$$0 \le \epsilon_L$$

$$0 \le \epsilon_U$$

Where $y_{cin}$ is equal to the input constraint,
$y_{cout}$ is equal to the output constraint,
$UB_{ycin}$ is the upper bounds for the input constraint,
$UB_{ycout}$ is the upper bounds for the output constraint, and
$\epsilon_U$ is a placeholder for an increase of the upper bounds.

In addition, a decrease of the input and output constraints may be provided according to Equation (17) below:

$$LB_{y_{c_{in}}} \le y_{c_{in}} \quad (17)$$

$$LB_{y_{c_{out}}} - \epsilon_L \le y_{c_{out}}$$

$$0 \le \epsilon_L$$

$$0 \le \epsilon_U$$

Where $y_{cin}$ is equal to the input contraint,
$y_{cout}$ is equal to the output contraint,
$LB_{ycin}$ is the upper bounds for the input constraint,
$LB_{ycout}$ is the lower bounds for the output constraint,
$\epsilon_U$ is a slack variable used in the eventual case of an upper bound violation, and
$\epsilon_L$ is a slack variable used in the eventual case of a lower bound violation.

As shown, the placeholder $\epsilon_U$ or $\epsilon_L$ may act as slack variables for the constraint. In addition, the placeholder $\epsilon_U$ or $\epsilon_L$ may be an absolute term. The placeholder $\epsilon_U$ or $\epsilon_L$ may also be any other term recognized in the art to provide increases or decreases in upper bounds or lower bounds of the desired values. For example, the placeholder $\epsilon_U$ or $\epsilon_L$ may also be an adaptive term that changes in real-time based on the conditions surrounding the wind turbine 10. Specifically, weights may also be applied to the slack variables to provide greater control over the constraints. In addition, the increases or decreases may be applied at the future time interval in response to the operating conditions of the wind turbine 10, such as those conditions received by the sensors of the wind turbine 10.

In another embodiment, the pitch adjustment factor may be one or more variance penalties for a pitch angle, a pitch rate, or a pitch acceleration of the at least one rotor blade 22. For example, variance penalties may be provided according to Equation (18) below:

$$\sum_{k=1}^{N}(\theta_k - \overline{\theta})^2 \quad (18)$$

Where $\theta_k$ is equal to the pitch angle of an individual rotor blade 22 (pitch rates and accelerations may also be utilized) and
$\tilde{\theta}$ is equal to the average of all of the rotor blades 22 of a wind turbine 10.

In yet another embodiment, the pitch adjustment factor may be one or more penalties for a total pitch angle change of the at least one rotor blade 22, i.e., the total angle traveled by each rotor blade 22 or all of the rotor blades 22 collectively. For example, total pitch angle change may be penalized according to Equation (19) below:

$$w\sum_{i=1}^{3}\sum_{k=1}^{N}|\dot{\theta}_{i,k}| \quad (19)$$

Where $\dot{\theta}_{i,k}$ is equal to the pitch change or pitch rate,
i is a blade index,
N is the prediction horizon, i.e., the time for which the control system 26 is set to estimate an expected state, and
W is a weight factor.

In an embodiment, the benefit of penalizing the total pitch change, for example, through increasing the weight factor W in Equation (17), is that the control system 26 can prevent micro-pitching, which are small movements of the blade pitch that are contributing significantly to the bearing life expenditure but without much benefit in loads mitigation. Additionally, Equation (17) will not prevent necessary control actions in the event of a gust event. Further, Equation (17) will also not heavily penalize large deviations in pitch angle, especially when compared to other conventional methods. Examples of these scenarios are gusts events, where the pitch should increase fast to mitigate loads, or cases with sudden wind speed decreases, where the pitch should reduce fast to capture more energy.

In still another embodiment, the pitch adjustment factor may be penalties for a product of a pitch travel of the at least one rotor blade 22 and a magnitude of load on the at least one rotor blade 22.

Referring back to FIG. 6, as shown at (112), the method 100 includes calculating, via an optimization solver implemented in the control system, an optimized pitch parameter for at least one rotor blade 22 of the wind turbine 10 from the linearized representation using the pitch adjustment factor and the pitch constraint. Specifically, the optimized pitch parameter may be the solution to the optimization problem which results in the cost function being minimized. For example, the optimized pitch parameter may be an output in the form of a trajectory of a pitch angle, a pitch rate, or a pitch acceleration for at least one of the rotor blades 22. The optimized pitch parameter may also be an optimized torque for the rotor 18 of the wind turbine 10.

In determining the optimized pitch parameter, the model may determine a pitch parameter of at least one rotor blade 22 to realize an outcome, such as the outcomes described above with reference to FIG. 8, using a pitch adjustment factor. Such outcomes may, for example, result in an increase or a reduction in a behavior exhibited by the wind turbine 10 such that an improvement of the pitch control of the wind turbine 10 is achieved. Such behaviors, which will be described in greater detail hereinbelow, may include symmetric or non-symmetric pitching, higher order harmonics in pitch activity, or operating the wind turbine 10 outside of set constraints or bounds.

In addition, as stated above, multiple pitch adjustment factors may be used to determine an optimized pitch parameter to achieve an outcome or multiple outcomes. The determination of the optimized pitch parameter may be achieved by using the pitch adjustment factor to modify the linearized representation of the expected state within the model to provide the optimized pitch parameter. This determination may take the form of a simulation of a pitch parameter of the wind turbine 10 being modified by the control system 26 such that the wind turbine 10 diverts from the expected state to an optimized state.

As shown at (114), the method 100 includes adjusting a pitch parameter of the at least one rotor blade 22 to the optimized pitch parameter such that the behavior exhibited by the wind turbine 10 is increased or reduced and the control of the wind turbine 10 is improved. By doing this, the rotor blade(s) 22 may be adjusted such that the rotor blade(s) 22 is modified to the optimized pitch parameter that achieves the outcome or outcomes provided within the model.

In another embodiment, the torque of the rotor 18 of the wind turbine 10 may be adjusted such that the behavior exhibited by the wind turbine is increased or reduced and the control of the wind turbine is improved. By doing this, the rotor blade(s) 22 may be adjusted such that the rotor 18 is modified to the optimized pitch parameter that achieves the outcome or outcomes provided within the model.

Thus, the control of the wind turbine 10 may be optimized through the use of the model to simulate an optimized pitch parameter and adjusting the wind turbine 10 with the control system 26 to align with the optimized pitch parameter.

Further, the control of the wind turbine 10 may be continually optimized. For example, by updating the simulation of the expected state based upon the adjustment of the pitch parameters of the at least one rotor blade 22, the model may be able to simulate new expected states and use those new expected states to further determine optimized states that the wind turbine 10 may be aligned to. Accordingly, the present disclosure provides systems and methods of continually optimizing pitch control using the control system 26.

Figure 11A:
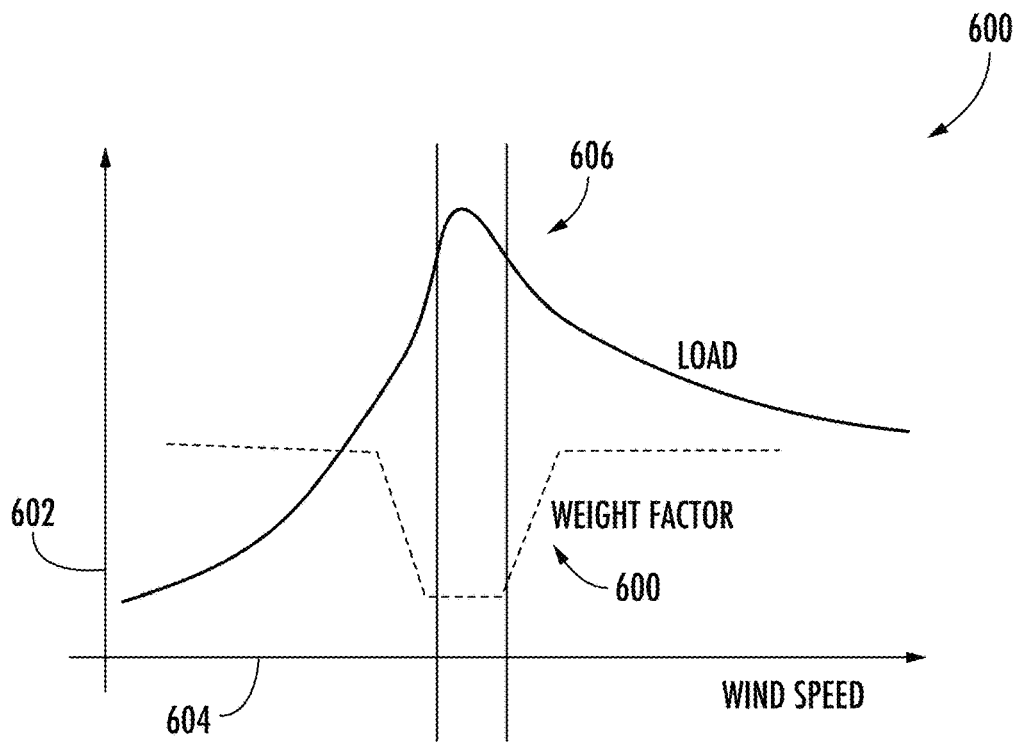
FIGS. 11A-11B illustrate graphs of pitch adjustment factors being applied in response to peak load intervals according to the present disclosure.
Figure 11B:
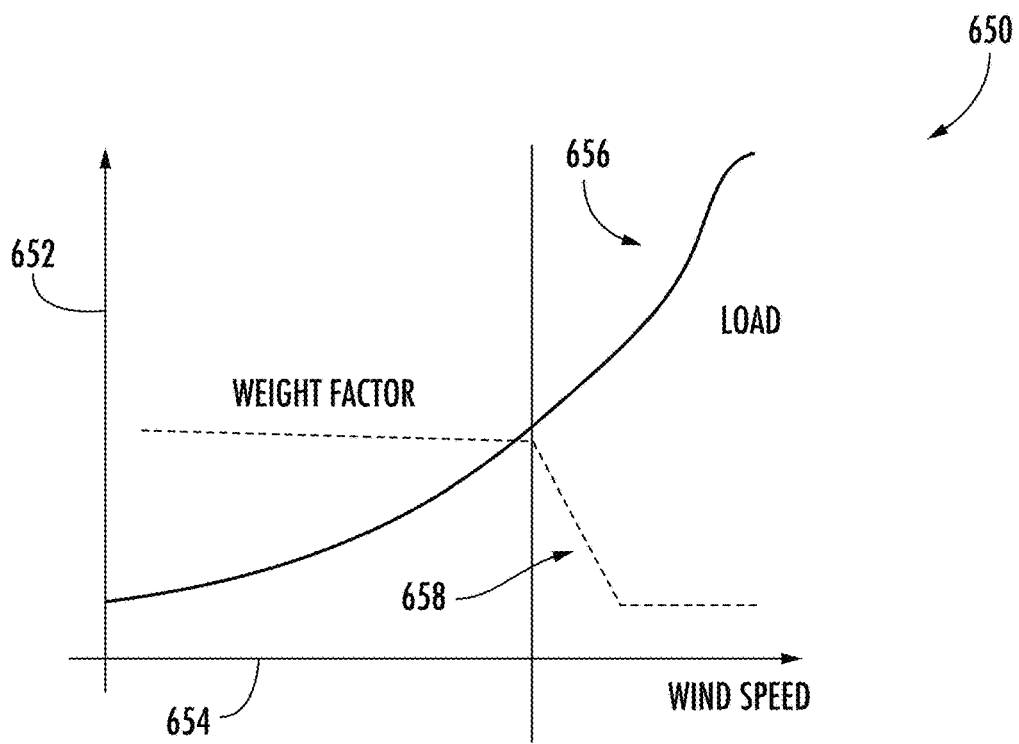

For example, referring now to FIGS. 11A-11B, various graphs of pitch adjustment factors being applied in response to peak load intervals according to an embodiment of the present disclosure are provided. As shown in either FIG. 11A or FIG. 11B, loads may be enhanced or mitigated. Specifically, as shown in FIGS. 11A-11B, the plots 600, 650 provide the loads and weight factor placed upon one or more rotor blades 22 on the y-axes 602, 652, while the x-axes 604, 654 provide the wind speed acting upon the one or more rotor blades 22. In addition, FIG. 11A provides a peak load interval 606 at one location on its plot 600, while FIG. 11B provides a peak load interval 656 at another location on its plot 650. Further, the peak load intervals coincide with minimal weight factor intervals 608, 658. Specifically, as shown in FIG. 11A, the peak load interval 606 is achieved at the minimum weight factor interval 608. As shown in FIG. 11B, the peak load interval 656 is achieved at the minimum weight factor interval 658. These peak load intervals 606, 656 and minimum weight factor intervals 608, 658 may be provided at different wind speeds. Conversely, loads are decreased at the portions outside the peak load intervals 606, 656 and minimum weight factor intervals 608, 658 as a result of the weight factor being applied more heavily. Thus, as previously described, these loads may be mitigated through the use of the pitch adjustment factors, which include weighting factors. In an example, an increase in a difference between pitch angle, pitch rate, or pitch acceleration may help reduce loads as shown in FIG. 9B as demonstrated by FIG. 11A or FIG. 11B. Pitch constraints may also be utilized to further enhance the control shown in FIGS. 11A-11B.

Referring now to FIGS. 12A-12D, various graphs of certain effects of pitch adjustment factors and pitch constraints being applied to increase or maintain a difference in a pitch parameter of a rotor blade of the wind turbine according to an embodiment of the present disclosure are provided. As shown, the pitch parameter may be power, pitch angle, generator torque, or pitch velocity where the solid line represent control using the pitch control system 26 using the pitch adjustment factors, while the dotted line represents pitch control according to conventional means.

Figure 12A:
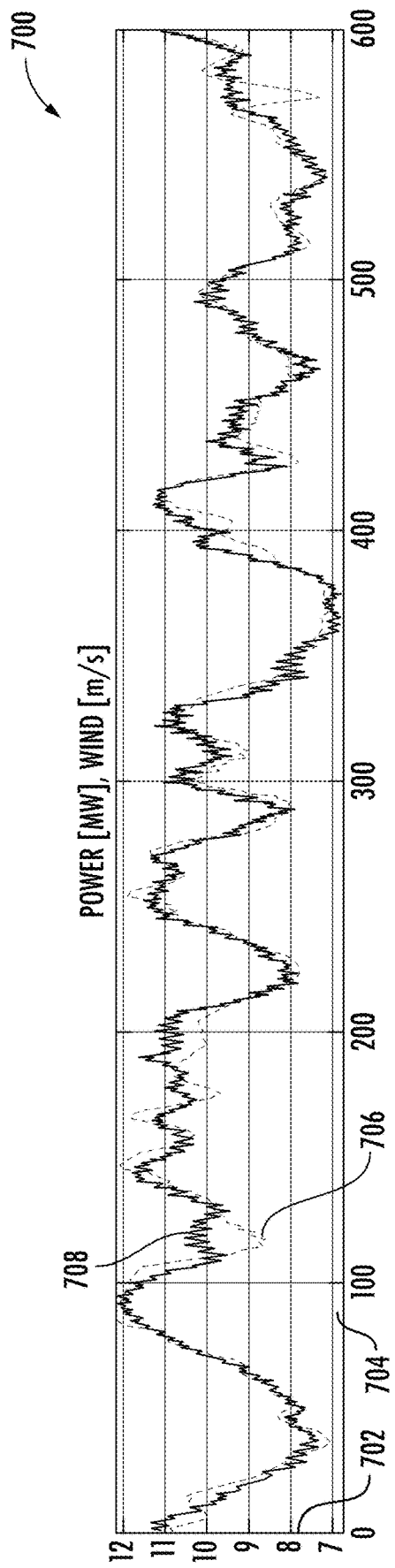
FIGS. 12A-12D illustrate graphs of the effects of adjusting a pitch parameter of a rotor blade to an optimized pitch parameter according to the present disclosure.

Specifically, as shown in FIG. 12A, a plot 700 of the power generated using the control system 26 in comparison with conventional methods. Further, as shown, power is provided on the y-axis 702, while time is plotted on the x-axis 704. In addition, conventional methods are indicated by line 706, while methods using the control system 26 are indicated by line 708. Moreover, as shown, the line 706 indicating conventional methods has deeper valleys and is consistently below the line 708 which indicates the methods using the control system 26. Thus, it can be seen that the methods using the control system 26 provide improved power generation when compared to conventional methods.

Figure 12B:
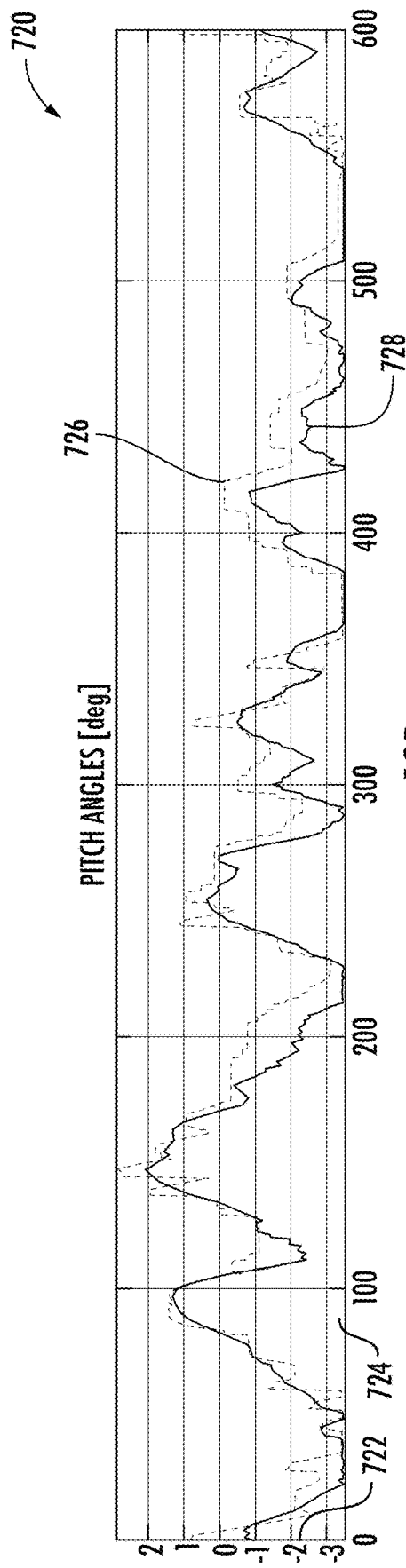

As shown in FIG. 12B, a plot 720 of the pitch angles of the rotor blades 22 using the control system 26 in comparison with conventional methods. Further, as shown, the pitch angle of one or more rotor blades 22 is provided on the y-axis 722, while time is plotted on the x-axis 724. In addition, conventional methods are indicated by line 726, while methods using the control system 26 are indicated by line 728. Moreover, as shown, the line 726 indicating conventional methods has a more erratic pattern, when compared to line 728, indicated by the greater amounts of peaks and troughs on line 726. Thus, it can be seen that the methods described herein provide greater control over the pitch angle action of the rotor blades 22 when compared with conventional methods.

Figure 12C:
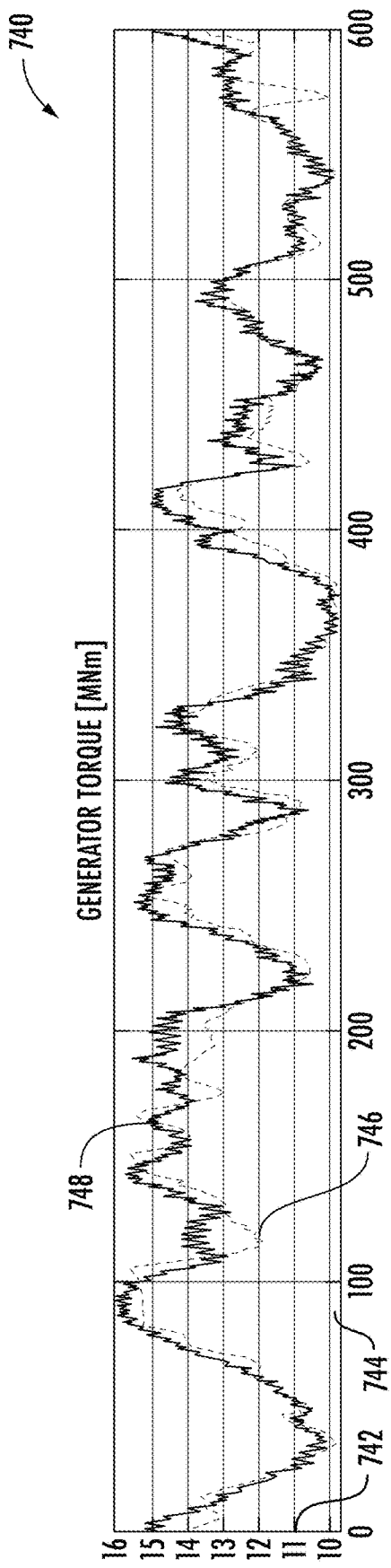

As shown in FIG. 12C, a plot 740 of the generator torque using the control system 26 in comparison with conventional methods. Further, as shown, generator torque is provided on the y-axis 742, while time is plotted on the x-axis 744. In addition, conventional methods are indicated by line 746, while methods using the control system 26 are indicated by line 748. Moreover, as shown, the line 746 indicating conventional methods has deeper valleys and is consistently below the line 748 which indicates methods using the control system 26. Thus, it can be seen that the methods described herein provide improved generator torque when compared to conventional methods.

Figure 12D:
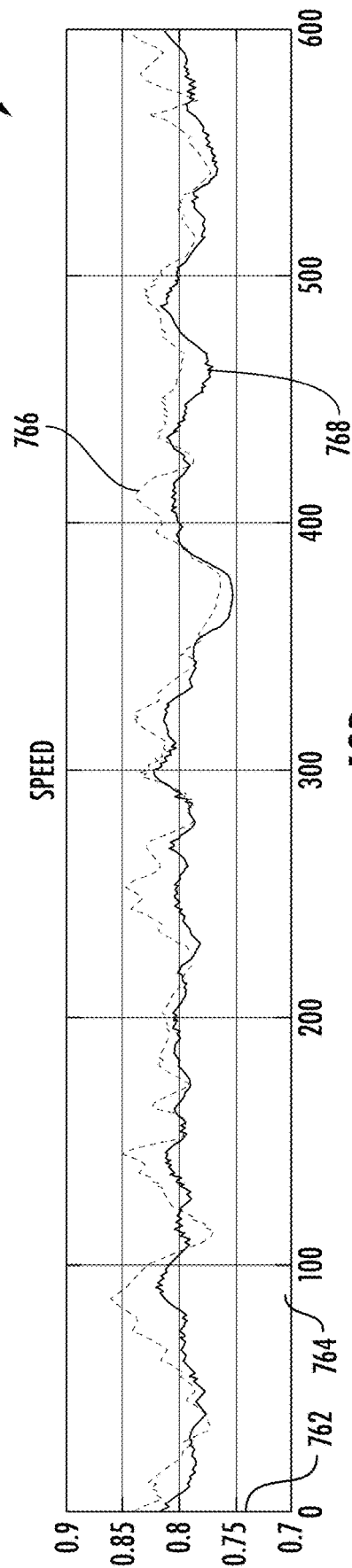

As shown in FIG. 12D, a plot 760 of the rotor speed of the wind turbine 10 using the control system 26 in comparison with conventional methods. Further, as shown, rotor speed is provided on the y-axis 762, while time is plotted on the x-axis 764. In addition, conventional methods are indicated by line 706, while methods using the control system 26 are indicated by line 768. Moreover, as shown, the line 766 indicating conventional methods has greater peaks and deeper valleys when compared with line 768 which indicates methods using the control system 26. Thus, it can be seen that methods using the control system 26 provide improved control over the speed of the rotor of the wind turbine 10 when compared with conventional methods. Thus, as shown, pitch control may be made smoother and more optimal through the use of the methods of control described herein when compared with conventional methods of control.

Various aspects and embodiments of the present invention are defined by the following numbered clauses:

Clause 1. A method for optimizing control of a wind turbine, the method comprising:
  receiving, via a control system, at least one condition of the wind turbine;
  estimating, via the control system, a current state of the wind turbine using the at least one condition;

calculating, via a model implemented by the control system, a linearized representation of an operation of the wind turbine for a future time interval following the current state;

defining, via the control system, an optimization problem to be solved, wherein the optimization problem comprises a cost function and a pitch constraint;

determining, via the control system, a pitch adjustment factor for modifying the current state of the wind turbine, wherein the pitch adjustment factor comprises at least one weight in the cost function that when implemented increases or reduces a behavior exhibited by the wind turbine, wherein the cost function is implemented in an optimization solver implemented by the control system;

calculating, via the optimization solver implemented in the control system, an optimized pitch parameter for at least one rotor blade of the wind turbine from the linearized representation using the pitch adjustment factor and the pitch constraint, wherein the optimized pitch parameter is the solution to the optimization problem; and adjusting a pitch parameter of the at least one rotor blade to the optimized pitch parameter such that the behavior exhibited by the wind turbine is increased or reduced and the control of the wind turbine is improved.

Clause 2. The method of clause 1, wherein the at least one condition comprises at least one measurement of rotor speed, generator speed, wind speed, wind direction, wind shear, wind veer, wind turbulence, structural forces or moments, structural displacements, structural velocities, or structural accelerations.

Clause 3. The method of any of clauses 1-2, wherein the current state of the wind turbine comprises an instantaneous aerodynamic effect distributed across a portion of the wind turbine, wherein the instantaneous aerodynamic effect comprises at least one of forces or moments acting upon the portion of the wind turbine; or wherein the current state of the wind turbine comprises an instantaneous structural effect across a portion of the wind turbine, wherein the instantaneous structural effect comprises at least one of structural displacement, structural velocity, or structural acceleration of any structural component of the wind turbine.

Clause 4. The method of any of the preceding clauses, wherein the improvement of the control of the wind turbine comprises a decrease in load on the wind turbine, an increase in bearing life expectancy, an increase in energy production, an increase in power quality, an increase in power tracking performance, or an increase in speed tracking performance.

Clause 5. The method of clause 4, wherein the optimized pitch parameter comprises a trajectory of a pitch angle, a pitch rate, or a pitch acceleration of the at least one rotor blade of the wind turbine.

Clause 6. The method of any of the preceding clauses, wherein the weight corresponds to a symmetric pitching motion of the at least one rotor blade of the wind turbine.

Clause 7. The method of any of the preceding clauses, wherein the weight corresponds to a non-symmetric pitching motion of the at least one rotor blade of the wind turbine.

Clause 8. The method of any of the preceding clauses, wherein the weight corresponds to an amplitude of harmonics higher than a fundamental frequency of a pitch angle, a pitch rate, or a pitch acceleration of the at least one rotor blade.

Clause 9. The method of clause 8, wherein the at least one rotor blade comprises a first rotor blade and a second rotor blade, wherein the pitch angle, the pitch rate, or the pitch acceleration of the first rotor blade comprises a higher frequency than the pitch angle, the pitch rate, or the pitch acceleration of the second rotor blade, wherein the weight is applied to the pitch angle, the pitch rate, or the pitch acceleration of the first rotor blade such that the amplitude of the harmonics higher than the fundamental frequency of the pitch angle, the pitch rate, or the pitch acceleration is decreased.

Clause 10. The method of any of the preceding clauses, wherein the pitch adjustment factor comprises one of linear or quadratic terms at the future time interval;

wherein the pitch constraint comprises linear or quadratic constraints at the future time interval; or wherein the pitch adjustment factor comprises variance or tracking for a pitch angle, a pitch rate, or a pitch acceleration of the at least one rotor blade.

Clause 11. The method of any of the preceding clauses, wherein the pitch constraint corresponds with a maximum or a minimum allowable pitch angle, pitch rate, or pitch acceleration for the at least one rotor blade; or wherein the pitch constraint corresponds with a maximum or a minimum allowable pitch motor torque, current, voltage, or power.

Clause 12. The method of clause 11, wherein the pitch constraint further comprises an increase or decrease of the maximum allowable pitch angle, pitch rate, or pitch acceleration of the at least one rotor blade or a decrease or increase of the minimum allowable pitch angle, pitch rate, or pitch acceleration of the at least one rotor blade, wherein the increases or decreases of the maximum or minimum allowable pitch angle, pitch rate, or pitch acceleration are applied at the future time interval in response to the received at least one condition; or wherein the pitch constraint further comprises an increase or decrease of the maximum allowable pitch motor torque, current, voltage, or power or a decrease or increase of the minimum allowable pitch motor torque, current, voltage, or power, wherein the increases or decreases of the maximum or minimum allowable pitch angle, pitch rate, or pitch acceleration are applied at the future time interval in response to the received at least one condition.

Clause 13. The method of any of the preceding clauses, wherein the pitch adjustment factor comprises two or more pitch adjustment factors, wherein the optimized pitch parameter for the at least one rotor blade is calculated using the two or more pitch adjustment factors and the pitch constraint.

Clause 14. The method of any of the preceding clauses, wherein the pitch adjustment factor comprises one or more penalties for a total pitch angle change of the at least one rotor blade or penalties for a product of a pitch travel of the at least one rotor blade and a magnitude of load on the at least one rotor blade.

Clause 15. The method of any of the preceding clauses, further comprising:

calculating, via the optimization solver implemented in the control system, an optimized torque for a rotor of the wind turbine from the linearized representation using the pitch adjustment factor using the pitch adjustment factor and the pitch constraint; and adjusting a torque of the rotor to the optimized torque such that the behavior exhibited by the wind turbine is increased or reduced and the control of the wind turbine is improved.

Clause 16. A system for optimizing control of a wind turbine, the system comprising:
  at least one sensor configured to monitor at least one condition of the wind turbine;
  a control system configured to:
    receive the at least one condition of the wind turbine;
    estimate, via the control system, a current state of the wind turbine using the at least one condition;
    calculate, via a model implemented by the control system, a linearized representation of an operation of the wind turbine for a future time interval following the current state;
    define, via the control system, an optimization problem to be solved, wherein the optimization problem comprises a cost function and a pitch constraint;
    determine, via the control system, the pitch adjustment factor for modifying the current state of the wind turbine, wherein the pitch adjustment factor comprises at least one weight in the cost function that when implemented increases or reduces a behavior exhibited by the wind turbine, wherein the cost function is implemented in an optimization solver implemented by the control system;
    calculate, via the optimization solver implemented in the control system, an optimized pitch parameter for at least one rotor blade of the wind turbine from the linearized representation using the pitch adjustment factor and the pitch constraint, wherein the optimized pitch parameter is the solution to the optimization problem; and
    adjust a pitch parameter of the at least one rotor blade to the optimized pitch parameter such that the behavior exhibited by the wind turbine is increased or reduced and the control of the wind turbine is improved.

Clause 17. The system of clause 16, wherein the at least one condition comprises at least one measurement of rotor speed, generator speed, wind speed, wind direction, wind shear, wind veer, wind turbulence, structural forces or moments, structural displacements, structural velocities, or structural accelerations.

Clause 18. The system of any of clauses 16-17, wherein the current state of the wind turbine comprises an instantaneous aerodynamic effect distributed across a portion of the wind turbine, wherein the instantaneous aerodynamic effect comprises at least one of forces or moments acting upon the portion of the wind turbine; or
  wherein the current state of the wind turbine comprises an instantaneous structural effect across a portion of the wind turbine, wherein the instantaneous structural effect comprises at least one of structural displacement, structural velocity, or structural acceleration of any structural component of the wind turbine.

Clause 19. The system of any of clauses 16-18, wherein the weight corresponds to a symmetric or a non-symmetric pitching motion of the at least one rotor blade of the wind turbine.

Clause 20. The system of any of clauses 16-19, wherein the weight corresponds to an amplitude of harmonics higher than a fundamental frequency of a pitch angle, a pitch rate, or a pitch acceleration of the at least one rotor blade.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for optimizing control of a wind turbine, the method comprising:
  receiving, via a control system, at least one condition of the wind turbine;
  estimating, via the control system, a current state of the wind turbine using the at least one condition;
  calculating, via a model implemented by the control system, a linearized representation of an operation of the wind turbine for a future time interval following the current state;
  defining, via the control system, an optimization problem to be solved, wherein the optimization problem comprises a cost function and a pitch constraint;
  determining, via the control system, a pitch adjustment factor for modifying the current state of the wind turbine, wherein the pitch adjustment factor comprises at least one weight in the cost function that when implemented increases or reduces a behavior exhibited by the wind turbine, wherein the cost function is implemented in an optimization solver implemented by the control system;
  calculating, via the optimization solver implemented in the control system, an optimized pitch parameter for at least one rotor blade of the wind turbine from the linearized representation using the pitch adjustment factor and the pitch constraint, wherein the optimized pitch parameter is the solution to the optimization problem; and
  adjusting a pitch parameter of the at least one rotor blade to the optimized pitch parameter such that the behavior exhibited by the wind turbine is increased or reduced and the control of the wind turbine is improved.

2. The method of claim 1, wherein the at least one condition comprises at least one measurement of rotor speed, generator speed, wind speed, wind direction, wind shear, wind veer, wind turbulence, structural forces or moments, structural displacements, structural velocities, or structural accelerations.

3. The method of claim 1, wherein the current state of the wind turbine comprises an instantaneous aerodynamic effect distributed across a portion of the wind turbine, wherein the instantaneous aerodynamic effect comprises at least one of forces or moments acting upon the portion of the wind turbine; or
  wherein the current state of the wind turbine comprises an instantaneous structural effect across a portion of the wind turbine, wherein the instantaneous structural effect comprises at least one of structural displacement, structural velocity, or structural acceleration of any structural component of the wind turbine.

4. The method of claim 1, wherein the improvement of the control of the wind turbine comprises a decrease in load on the wind turbine, an increase in bearing life expectancy, an increase in energy production, an increase in power quality, an increase in power tracking performance, or an increase in speed tracking performance.

5. The method of claim 4, wherein the optimized pitch parameter comprises a trajectory of a pitch angle, a pitch rate, or a pitch acceleration of the at least one rotor blade of the wind turbine.

6. The method of claim 1, wherein the weight corresponds to a symmetric pitching motion of the at least one rotor blade of the wind turbine.

7. The method of claim 1, wherein the weight corresponds to a non-symmetric pitching motion of the at least one rotor blade of the wind turbine.

8. The method of claim 1, wherein the weight corresponds to an amplitude of harmonics higher than a fundamental frequency of a pitch angle, a pitch rate, or a pitch acceleration of the at least one rotor blade.

9. The method of claim 8, wherein the at least one rotor blade comprises a first rotor blade and a second rotor blade,
wherein the pitch angle, the pitch rate, or the pitch acceleration of the first rotor blade comprises a higher frequency than the pitch angle, the pitch rate, or the pitch acceleration of the second rotor blade,
wherein the weight is applied to the pitch angle, the pitch rate, or the pitch acceleration of the first rotor blade such that the amplitude of the harmonics higher than the fundamental frequency of the pitch angle, the pitch rate, or the pitch acceleration is decreased.

10. The method of claim 1, wherein the pitch adjustment factor comprises one of linear or quadratic terms at the future time interval;
wherein the pitch constraint comprises linear or quadratic constraints at the future time interval; or
wherein the pitch adjustment factor comprises variance or tracking for a pitch angle, a pitch rate, or a pitch acceleration of the at least one rotor blade.

11. The method of claim 1, wherein the pitch constraint corresponds with a maximum or a minimum allowable pitch angle, pitch rate, or pitch acceleration for the at least one rotor blade; or
wherein the pitch constraint corresponds with a maximum or a minimum allowable pitch motor torque, current, voltage, or power.

12. The method of claim 11, wherein the pitch constraint further comprises an increase or decrease of the maximum allowable pitch angle, pitch rate, or pitch acceleration of the at least one rotor blade or a decrease or increase of the minimum allowable pitch angle, pitch rate, or pitch acceleration of the at least one rotor blade, wherein the increases or decreases of the maximum or minimum allowable pitch angle, pitch rate, or pitch acceleration are applied at the future time interval in response to the received at least one condition; or
wherein the pitch constraint further comprises an increase or decrease of the maximum allowable pitch motor torque, current, voltage, or power or a decrease or increase of the minimum allowable pitch motor torque, current, voltage, or power, wherein the increases or decreases of the maximum or minimum allowable pitch angle, pitch rate, or pitch acceleration are applied at the future time interval in response to the received at least one condition.

13. The method of claim 1, wherein the pitch adjustment factor comprises two or more pitch adjustment factors, wherein the optimized pitch parameter for the at least one rotor blade is calculated using the two or more pitch adjustment factors and the pitch constraint.

14. The method of claim 1, wherein the pitch adjustment factor comprises one or more penalties for a total pitch angle change of the at least one rotor blade or penalties for a product of a pitch travel of the at least one rotor blade and a magnitude of load on the at least one rotor blade.

15. The method of claim 1, further comprising:
calculating, via the optimization solver implemented in the control system, an optimized torque for a rotor of the wind turbine from the linearized representation using the pitch adjustment factor using the pitch adjustment factor and the pitch constraint; and
adjusting a torque of the rotor to the optimized torque such that the behavior exhibited by the wind turbine is increased or reduced and the control of the wind turbine is improved.

16. A system for optimizing control of a wind turbine, the system comprising:
at least one sensor configured to monitor at least one condition of the wind turbine;
a control system configured to:
receive the at least one condition of the wind turbine;
estimate, via the control system, a current state of the wind turbine using the at least one condition;
calculate, via a model implemented by the control system, a linearized representation of an operation of the wind turbine for a future time interval following the current state;
define, via the control system, an optimization problem to be solved, wherein the optimization problem comprises a cost function and a pitch constraint;
determine, via the control system, the pitch adjustment factor for modifying the current state of the wind turbine, wherein the pitch adjustment factor comprises at least one weight in the cost function that when implemented increases or reduces a behavior exhibited by the wind turbine, wherein the cost function is implemented in an optimization solver implemented by the control system;
calculate, via the optimization solver implemented in the control system, an optimized pitch parameter for at least one rotor blade of the wind turbine from the linearized representation using the pitch adjustment factor and the pitch constraint, wherein the optimized pitch parameter is the solution to the optimization problem; and
adjust a pitch parameter of the at least one rotor blade to the optimized pitch parameter such that the behavior exhibited by the wind turbine is increased or reduced and the control of the wind turbine is improved.

17. The system of claim 16, wherein the at least one condition comprises at least one measurement of rotor speed, generator speed, wind speed, wind direction, wind shear, wind veer, wind turbulence, structural forces or moments, structural displacements, structural velocities, or structural accelerations.

18. The system of claim 16, wherein the current state of the wind turbine comprises an instantaneous aerodynamic effect distributed across a portion of the wind turbine, wherein the instantaneous aerodynamic effect comprises at least one of forces or moments acting upon the portion of the wind turbine; or
wherein the current state of the wind turbine comprises an instantaneous structural effect across a portion of the wind turbine, wherein the instantaneous structural effect comprises at least one of structural displacement, structural velocity, or structural acceleration of any structural component of the wind turbine.

19. The system of claim 16, wherein the weight corresponds to a symmetric or a non-symmetric pitching motion of the at least one rotor blade of the wind turbine.

20. The system of claim 16, wherein the weight corresponds to an amplitude of harmonics higher than a fundamental frequency of a pitch angle, a pitch rate, or a pitch acceleration of the at least one rotor blade.

* * * * *